United States Patent
Ting et al.

(10) Patent No.: US 12,431,509 B2
(45) Date of Patent: Sep. 30, 2025

(54) CATALYST FOR FUEL CELLS AND METHODS OF PREPARING THE SAME

(71) Applicant: NATIONAL CHENG KUNG UNIVERSITY, Tainan (TW)

(72) Inventors: Jyh-Ming Ting, Tainan (TW); Zi-Yun Wei, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 506 days.

(21) Appl. No.: 18/058,979

(22) Filed: Nov. 28, 2022

(65) Prior Publication Data

US 2024/0170686 A1    May 23, 2024

(30) Foreign Application Priority Data

Nov. 18, 2022  (TW) .................... 111144249

(51) Int. Cl.
*H01M 4/90* (2006.01)
*H01M 4/86* (2006.01)
*H01M 4/88* (2006.01)

(52) U.S. Cl.
CPC ....... *H01M 4/9016* (2013.01); *H01M 4/8621* (2013.01); *H01M 4/8803* (2013.01); *H01M 4/8825* (2013.01); *H01M 4/9075* (2013.01)

(58) Field of Classification Search
None
See application file for complete search history.

(56) References Cited

U.S. PATENT DOCUMENTS

| | | | | |
|---|---|---|---|---|
| 7,306,824 B1 * | 12/2007 | Coker | .................. | B82Y 30/00 427/229 |
| 2015/0086727 A1 * | 3/2015 | Wang | .................. | H01M 4/8878 427/553 |

* cited by examiner

*Primary Examiner* — Haroon S. Sheikh
(74) *Attorney, Agent, or Firm* — HSML P. C.

(57) ABSTRACT

The present disclosure provides a catalyst for urea oxidation reaction, a method of preparing the same, and a use thereof. The catalyst for urea oxidation reaction includes transition metal oxides forming on a metal substrate, and the transition metals includes Fe, Co, and Ni. The method for preparing the catalyst includes contacting the metal substrate with a homogeneous solution to obtain the catalyst for urea oxidation reaction, and the homogeneous solution includes transition metal nitrate precursors and a sulfur precursor. The method of the present application is a low-cost, high-efficiency, and simple process that can be mass produced.

16 Claims, 38 Drawing Sheets

CATALYST FOR FUEL CELLS AND METHODS OF PREPARING THE SAME

TECHNICAL FIELD

The present disclosure relates to a catalyst for urea oxidation reaction, especially a catalyst for urea oxidation reaction applied in a fuel cell.

BACKGROUND

A fuel cell is a power generation device that converts chemical energy in a fuel into electrical energy through a reduction-oxidation (redox) reaction by oxygen or other oxidants, and the most common fuel is hydrogen. Hydrogen produced from the electrolysis of water is a social, economic, and low-polluting method for producing hydrogen energy. However, the kinetics of the oxygen evolution reaction (OER) is slow due to the high activation energy barrier of the O—O bond for forming oxygen. Compared with the theoretical potential of water electrolysis of 1.23 V, the theoretical potential of urea electrolysis requiring only 0.37 V is much lower than that of water electrolysis. Using urea in place of oxygen can improve hydrogen production efficiency. Therefore, urea decomposition is a promising and high-profile hydrogen production method. Nevertheless, the urea oxidation reaction (UOR) is a six-electron transfer reaction with slow reaction kinetics. Hence, there is a need to develop a high-performance catalyst with an improved UOR reaction rate.

Transition metal catalysts exhibit excellent UOR catalytic performance. Transition metals are advantageous in abundant, cheap, and highly efficient, and are regarded as the most potential materials for electrocatalyst. Numerous studies have published efficient transition metal catalysts, and for example, common materials are nitrides, phosphides, oxides, sulfides, and hydroxides. In recent years, researches on optimizing the efficiency of hydrogen production provide many improvement strategies at different levels, in which the multi-doping of transition metals, a common and effective strategy for optimizing catalytic efficiency, can combine the properties of different metals, adjust the electronic configuration, and effectively improve the catalytic performance.

Nowadays, most transition metal catalysts are synthesized by hydrothermal methods or electroplating methods, but both of them require tedious and complicated processes, such as high temperature or pressure, and thus consume a lot of energy. In addition, for carrying out the catalytic reaction, the powdered catalysts prepared by the hydrothermal method must be further attached to a conductive substrate through an adhesive, which causes the problems of poor conductivity and stability and further reduces the catalytic performance of the catalyst prepared by the hydrothermal method for UOR.

Therefore, how to overcome the above problems and provide an energy-saving and fast process to generate a urea oxidation catalyst is a difficult problem to be solved urgently in the current industry.

SUMMARY

In view of the above-mentioned defects of the prior art, the present disclosure provides a cost-effective, energy-saving, and rapid method to synthesize a urea oxidation catalyst with a high catalytic performance by providing active sites of UOR through metal hydroxides. Thereby, the active sites, the activity, and the stability of the reaction are increased and/or enhanced through the synergistic effect caused by a variety of metal elements. In addition, compared with the hydrothermal method having a long reaction time and requiring the addition of various solvents, the urea oxidation catalyst of the present disclosure can be prepared through a single-step and simple metal corrosion method. Therefore, the obtained urea oxidation catalyst can be directly formed on the metal substrate and can be attached to the conductive substrate without using the adhesive in the subsequent application, so as to avoid the problem of the decrease of the catalytic effect caused by the increased resistance resulting from the adhesive.

The present disclosure provides a method for preparing a urea oxidation catalyst, comprising contacting a metal substrate with a homogeneous solution for performing a metal corrosion reaction to obtain the urea oxidation catalyst, wherein the homogeneous solution comprises transition metal nitrate precursors and a sulfur precursor dissolved therein, wherein the urea oxidation catalyst comprises a sulfur-doped transition metal hydroxide formed on the metal substrate, and wherein the transition metal hydroxide is represented by MNZ(OH)$_x$, the M, N and Z are iron, cobalt, and nickel, respectively, and x is a positive integer from 1 to 3.

In an embodiment of the preparation method of the present disclosure, the sulfur-doped transition metal hydroxide is uniformly formed on the metal substrate. In another embodiment, the metal substrate is a porous metal substrate.

In an embodiment of the preparation method of the present disclosure, the sulfur-doped transition metal hydroxide formed on the metal substrate includes a structure of nanoparticles.

In an embodiment of the preparation method of the present disclosure, the porous metal substrate is a nickel foam.

In an embodiment of the preparation method of the present disclosure, the transition metal nitrate precursors and the sulfur precursor are dissolved in water, ethanol, isopropanol, or any combination thereof.

In an embodiment of the preparation method of the present disclosure, the transition metal nitrate precursors include a nickel nitrate precursor, a ferric nitrate precursor, and a cobalt nitrate precursor. In another embodiment, the contents of the nickel nitrate precursor, the ferric nitrate precursor, and the cobalt nitrate precursor are equimolar.

In an embodiment of the preparation method of the present disclosure, the urea oxidation catalyst comprises 25 to 30 element % of the nickel, 0.8 to 1.5 element % of the iron, 0.2 to 0.7 element % of the cobalt, 5 to 10 element % of the sulfur, and 55 to 70 element % of the O, based on the total amount of the sulfur, M, N, Z, and O.

In an embodiment of the preparation method of the present disclosure, the sulfur precursor includes one selected from the group consisting of thiourea, sodium thiosulphate, sodium sulfide, and a combination thereof.

In an embodiment of the preparation method of the present disclosure, this method is carried out at room temperature.

In an embodiment of the preparation method of the present disclosure, this method is performed without applying voltage or current.

The present disclosure further provides a urea oxidation catalyst, comprising a sulfur-doped transition metal hydroxide and a metal substrate, wherein the transition metal hydroxide of the sulfur-doped transition metal hydroxide is represented by MNZ(OH)$_x$, the M, N, and Z are iron, cobalt, and nickel, respectively, and x is a positive integer from 1 to 3, and wherein the sulfur-doped transition metal hydroxide is disposed on the metal substrate.

In an embodiment of the catalyst of the present disclosure, the metal substrate is a porous metal substrate.

In one embodiment of the catalyst of the present disclosure, the porous metal substrate is a nickel foam.

In one embodiment of the catalyst of the present disclosure, the urea oxidation catalyst comprises 25 to 30 element % of the nickel, 0.8 to 1.5 element % of the iron, 0.2 to 0.7 element % of the cobalt, 5 to 10 element % of the sulfur, and 55 to 70 element % of the O, based on the total amount of the sulfur, M, N, Z, and O.

In one embodiment of the catalyst of the present disclosure, the sulfur-doped transition metal hydroxide includes a structure of nanoparticles.

The present disclosure further provides a use of the urea oxidation catalyst, comprising the use in a hydrogen fuel cell.

The present disclosure develops a rapid and energy-saving single-step method of preparing the urea oxidation catalyst for synthesizing sulfur-doped transition metal hydroxide. The transition metal can be directly grown and covered on the substrate through multiple redox reactions and metal replacement reactions. In addition, adding a sulfur precursor as a source of sulfur, the hydrolysis of the sulfur precursor can accelerate the metal corrosion reaction, increase the pH of the reaction solution, and allow the solution to be filled with OH$^-$, thereby promoting the formation of sulfur-doped hydroxide on the metal alloy.

The urea oxidation catalyst provided by the present disclosure has a high surface area and metal phase. Further, the urea oxidation catalyst has high conductivity due to the doping of the sulfur, and more high-valence active sites are exposed through the adjusted electronic structure by multi-metal doping and sulfur doping. Moreover, the low resistance of the transition metal hydroxide directly grown on the metal substrate makes the electron transfer rate faster, and the urea oxidation catalyst thus exhibits excellent UOR activity. As can be seen from the above, the present disclosure provides a rapid, energy-free, and high-efficiency process, and the prepared urea oxidation catalyst has excellent UOR catalytic performance and extremely high economic efficiency of hydrogen production.

DETAILED DESCRIPTIONS

Figure 1:
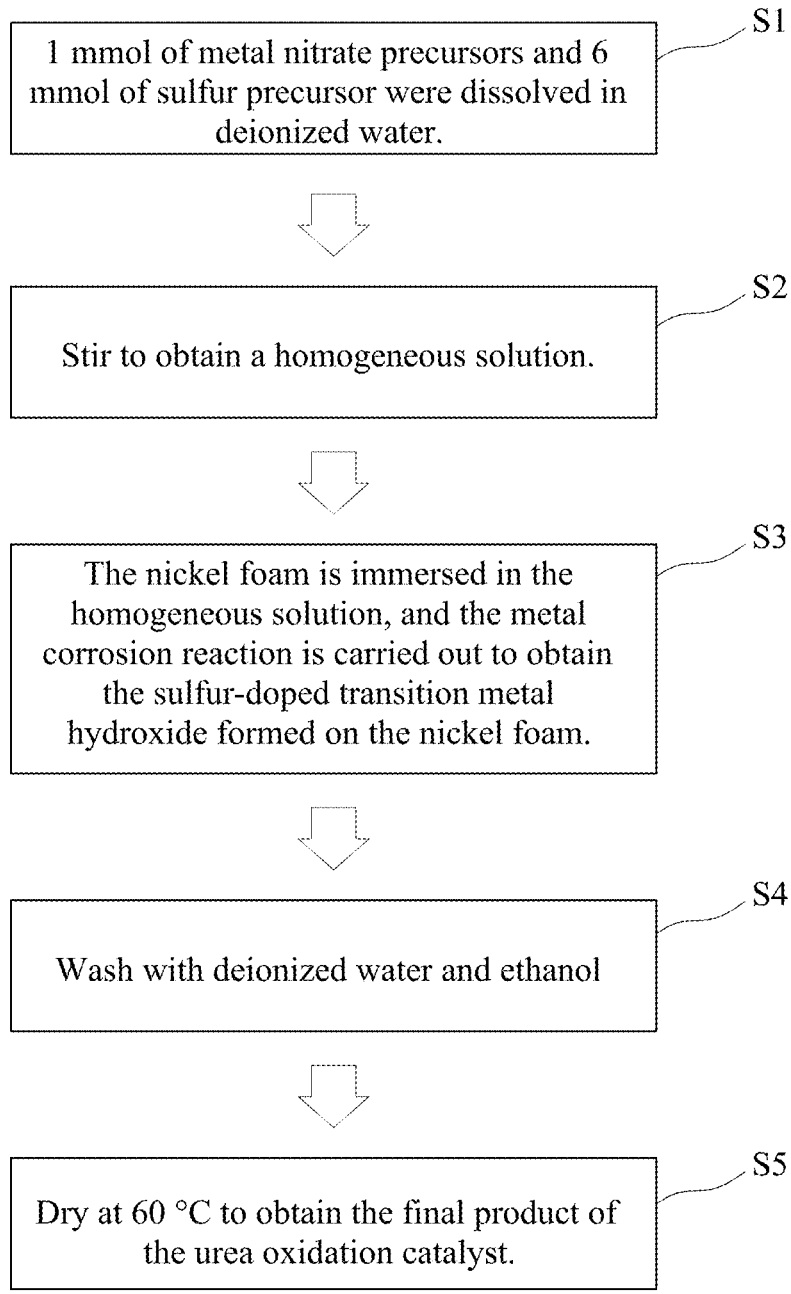
FIG. 1 is the synthesis flow chart of Example 1 of the present disclosure.

The implementations of the present disclosure are described below by specific embodiments, and a person with ordinary skill in the art can easily understand the advantages and effects of the present disclosure from the contents disclosed herein. The present disclosure can also be implemented or applied by other different embodiments, and various details in this specification can also be given different modifications and changes based on different viewpoints and applications without departing from the concept disclosed in the present disclosure. Furthermore, all ranges and values herein are inclusive and combinable. Any value or point falling within a range described herein, e.g., any integer, can be taken as a minimum or maximum value to derive a subordinate range, etc.

According to the preparation method of the urea oxidation catalyst of the present disclosure, comprising contacting a metal substrate with a homogeneous solution to perform a metal corrosion reaction and to obtain the urea oxidation catalyst, wherein the homogeneous solution comprises transition metal nitrate precursors and a sulfur precursor dissolved therein.

In one embodiment, the sulfur-doped transition metal hydroxide is uniformly formed on the metal substrate. It should be understood that the metal substrate used in the present disclosure can be any metal substrate, and a person with ordinary skill in the art can replace and modify the metal substrate according to actual needs and applications; preferably, the metal substrate used in the present disclosure is a porous metal substrate. In another embodiment, the metal substrate is nickel foam.

In one embodiment, the sulfur-doped transition metal hydroxide formed on a metal substrate has nanoparticles. Specifically, the sulfur-doped transition metal hydroxide is nanoparticles that densely and uniformly cover the metal substrate. Spheres, consisting of a stack of nanoparticles of equal size, with a diameter of about 50 to 200 nm can be observed on the metal substrate. Therefore, the structure of the urea oxidation catalyst of the present disclosure has a high surface area, which allows more active sites to be exposed, thereby promoting the catalytic reaction.

In one embodiment, the transition metal nitrate precursors and the sulfur precursor are dissolved in water, ethanol, isopropanol, or any combination thereof. In another embodiment, the transition metal nitrate precursors and the sulfur precursor are dissolved in water and ethanol or water and isopropanol. The ethanol is in a range of 0-100 weight % based on the total amount of water and ethanol, such as 0, 10, 20, 30, 40, 50, 60, 70, 80, 90, and 100 weight %; and the isopropanol is in a range of 0-100 weight % based on the total amount of water and isopropanol, such as 0, 10, 20, 30, 40, 50, 60, 70, 80, 90, and 100 weight %. Preferably, the transition metal nitrate precursors and the sulfur precursor are dissolved in water. In yet another embodiment, the reaction solution of the preparation method of the present disclosure is formulated in a solvent (e.g., deionized water) first, allowing the metal nitrate precursors and the sulfur precursor to be dissolved in the solvent, and making the reactants be completely dissolved through stirring, such that a homogeneous solution is obtained.

In one embodiment, the contents of the transition metal nitrate precursors are each equimolar. In another embodiment, the transition metal nitrate precursors include a nickel nitrate precursor, a ferric nitrate precursor, and a cobalt nitrate precursor. In yet another embodiment, the contents of the nickel nitrate precursor, the ferric nitrate precursor, and the cobalt nitrate precursor are equimolar. Further, based on the composition of the urea oxidation catalyst to be prepared, a person with ordinary skill in the art is able to adjust the contents and ratios of the transition metal nitrate precursors and the sulfur precursor. The contents and ratios of the reactants and solutions suitable for the preparation method of the present invention under different reaction conditions can be obtained and optimized by a person with ordinary skill in the art with limited numbers of attempts and experiments.

In one embodiment, the sulfur precursor comprises one selected from the group consisting of thiourea, thiosulphate, sodium sulfide, and a combination thereof. The sulfur precursor is not only used as a source of sulfur but also used to accelerate the metal corrosion reaction through the hydrolysis thereof during the process. Additionally, the oxygen dissolved in the solution undergoes a reduction reaction, which increases the pH of the solution and allows the solution to be filled with $OH^-$, thereby the formation of sulfur-doped hydroxide on the metal alloy is promoted.

In one embodiment, the sulfur precursor used in the preparation method of the present disclosure includes thiourea, thiosulphate, sodium sulfide, or a combination thereof.

In one embodiment, the preparation method of the present disclosure is carried out at room temperature, for example, 20 to 40° C. such as 20° C., 21° C., 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., 40° C., but not limited thereto. In another embodiment, the preparation method of the present disclosure can be performed without applying voltage or current.

Preferably, the preparation method of the present disclosure is carried out at room temperature without applying voltage or current. More preferably, the preparation method of the present disclosure can be completed in a very short reaction time. For example, the reaction can be completed in only about 12 minutes in terms of a total amount of 1 mmol of the transition metal nitrate precursors as the reactants, but not limited thereto.

The present disclosure further provides a urea oxidation catalyst, comprising a metal substrate and a sulfur-doped transition metal hydroxide formed thereon, wherein the transition metal hydroxide is represented by $MNZ(OH)_x$, the M, N, and Z is iron, cobalt, and nickel, respectively, x is a positive integer from 1 to 3, such as 1, 2, or 3.

In one embodiment, the urea oxidation catalyst comprises 25 to 30 element % of the nickel, e.g., 25 element %, 26 element %, 27 element %, 28 element %, 29 element %, or 30 element % of the nickel; 0.8 to 1.5 element % of the iron, e.g., 0.8 element %, 0.9 element %, 1.0 element %, 1.1 element %, 1.2 element %, 1.3 element %, 1.4 element % or 1.5 element % of the iron; 0.2 to 0.7 element % of the cobalt, e.g., 0.2 element %, 0.3 element %, 0.4 element %, 0.5 element %, 0.6 element % or 0.7 element % of the cobalt; 5 to 10 element % of the sulfur, e.g., 5 element %, 6 element %, 7 element %, 8 element %, 9 element % or 10 element % of the sulfur; and 55 to 70 element % O, e.g., 55 element %, 56 element %, 57 element %, 58 element %, 59 element %, 60 element %, 61 element %, 62 element %, 63 element %, 64 element %, 65 element %, 66 element %, 67 element %, 68 element %, 69 element % or 70 element % of the O, based on the total amount of the sulfur, M, N, Z, and O.

In another aspect, the present disclosure provides a catalyst for a fuel cell, such as a hydrogen fuel cell, comprising the aforementioned urea oxidation catalyst. In other words, the present disclosure provides the above-mentioned preparation method of the sulfur-doped transition metal hydroxide and uses the sulfur-doped transition metal hydroxide as a catalyst for a fuel cell. Specifically, the present disclosure provides a use of the above-mentioned sulfur-doped transition metal hydroxide for catalyzing urea oxidation reaction.

EXAMPLES

The present disclosure is further described in detail below by specific embodiments, but the scope of the present disclosure is not limited by the description of the embodiments.

Example 1: The Preparation of Sulfur-Doped Transition Metal Hydroxide

The synthesis process of the sulfur-doped transition metal hydroxide provided by the present disclosure is shown in step 1 (S1) and step 2 (S2) of FIG. 1. First, the metal nitrate precursors and the sulfur precursor were dissolved in deionized water and then stirred to obtain a homogeneous solution. That is to say, an equimolar mixture of nickel nitrate ($Ni(NO_3)_2 \cdot 6H_2O$, a purity of 98.5%, purchased from Alfa Aesar), ferric nitrate ($Fe(NO_3)_3 \cdot 9H_2O$, a purity of 99%, purchased from J. T. Baker) and cobalt nitrate ($Co(NO_3)_2 \cdot 6H_2O$, a purity of 99%, purchased from J. T. Baker) was added as the metal nitrate precursors, and the mole of the metal nitrate precursors was 1 mmol in total. The aforesaid metal nitrate precursors, 5 mmol of LiCl, and 6 mmol of thiourea (purchased from Sigma-Aldrich) used as the sulfur precursor was dissolved in 50 mL of deionized water to form a reaction solution. Stirring the reaction solution to obtain a homogeneous solution.

Next, as shown in step 3 (S3) of FIG. 1, the acid-treated nickel foam was immersed in the homogeneous solution, and a metal corrosion reaction was performed to obtain the sulfur-doped transition metal hydroxide. As shown in step 4 (S4) of FIG. 1, the sulfur-doped transition metal hydroxide obtained in S3 was washed several times with deionized water and ethanol to remove excess ions and solutions. Then, as shown in step 5 (S5) of FIG. 1, the washed sulfur-doped transition metal hydroxide from S4 was dried in a vacuum oven at 60° C. A sulfur-doped transition metal hydroxide directly grown on a nickel foam substrate was finally obtained, hereinafter referred to as S—NiFeCo(OH)$_x$, i.e., the urea oxidation catalyst of the present disclosure.

Since the nickel foam was easily oxidized in the air, thereby a nickel oxide was formed on the surface thereof. Acid cleaning for the nickel form to remove the oxides on the surface was needed before the metal corrosion reaction. Specifically, the nickel foam was soaked in 3M HCl and was sonicated in an ultrasonicator for 15 minutes to remove the nickel oxide on the surface. Afterward, the nickel foam was soaked and sonicated for 15 minutes in deionized water and alcohol in sequence, respectively. Lastly, the nickel foam was purged with nitrogen and was dried in a vacuum oven at 60° C.

The sulfur-doped transition metal hydroxide in the urea oxidation catalyst prepared in Example 1 was directly generated on the metal substrate, and therefore the product can be directly used as a working electrode without additional adhesive. As such, the setup of the working electrode was completed simply by using copper tapes as a bridge for the current conduction connecting between the working electrode and the electrochemical analysis device.

Example 2: The Preparation of Sulfur-Doped Transition Metal Hydroxide

Using the same method as described in Example 1, except that the added sulfur precursor was 6 mmol of $Na_2S_2O_3 \cdot 5H_2O$ (purity of 99.5%, purchased from Sigma-Aldrich).

Example 3: The Preparation of Sulfur-Doped Transition Metal Hydroxide

Using the same method as described in Example 1, except that the added sulfur precursor was 6 mmol of $Na_2S \cdot 9H_2O$ (purity of 98%, purchased from Sigma-Aldrich).

Comparative Example 1: Preparation of Pure Metal Hydroxide

Using the same method as described in Example 1, except that no sulfur precursor was added to the reaction solution, hereinafter referred to as NiFeCo(OH)$_x$.

Comparative Example 2: Preparation of Sulfur-Doped Binary Metal Hydroxide

Using the same method as described in Example 1, except that only nickel nitrate and ferric nitrate were added as the transition metal nitrate precursors, hereinafter referred to as S—NiFe(OH)$_x$.

Comparative Example 3: Preparation of Sulfur-Doped Monometallic Hydroxide

Using the same method as described in Example 1, except that only nickel nitrate was added as the transition metal nitrate precursor, hereinafter referred to as S—Ni(OH)$_x$.

It is noted that the aforementioned symbol "x" in S—NiFeCo(OH)$_x$, NiFeCo(OH)$_x$, S—NiFe(OH)$_x$, and S—Ni(OH)$_x$ is not designated as particular meanings. The symbol "x" is only used for the abbreviation of the products prepared in Example 1 and Comparative Examples 1-3, and there is no further description of x herein.

Figure 2:
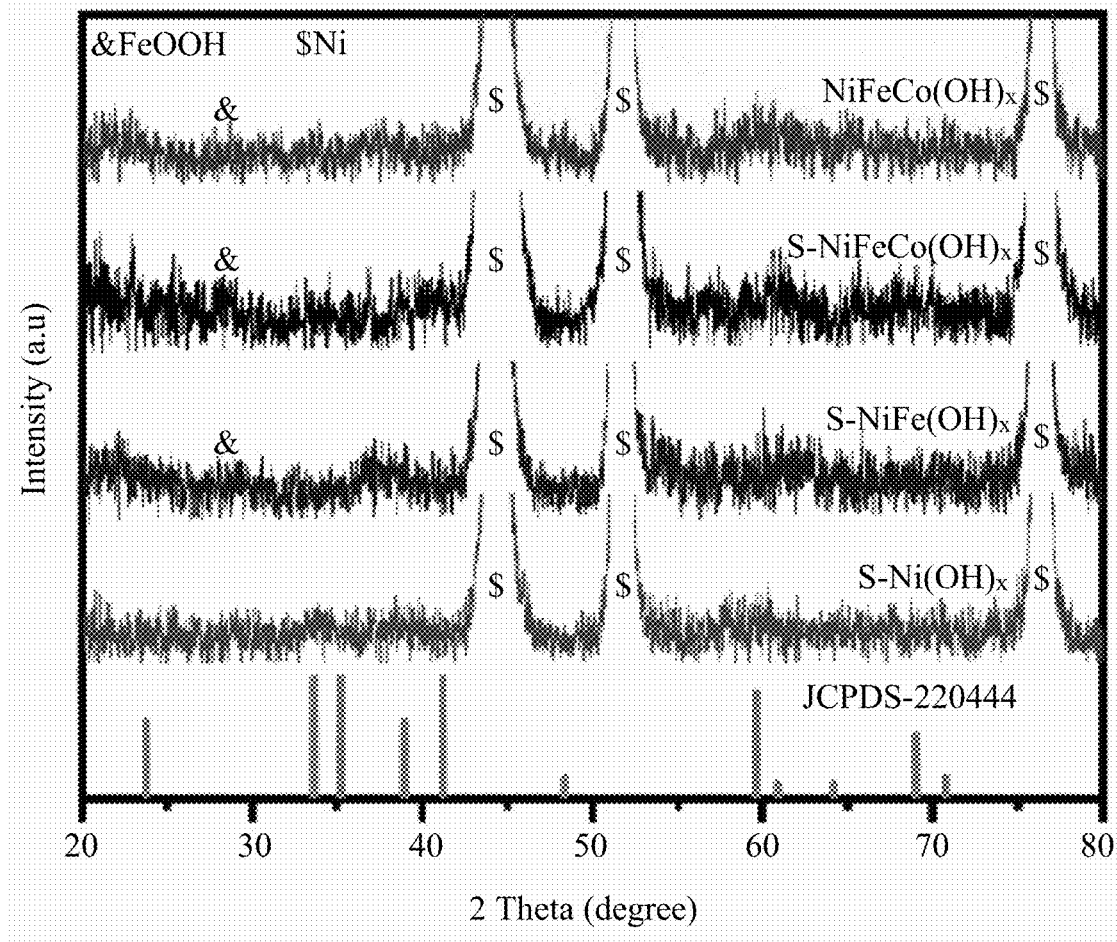
FIG. 2 is an X-ray diffraction (XRD) diagram of Example 1 and Comparative Examples 1 to 3 of the present disclosure.

Example 1 and Comparative Examples 1 to 3 were subjected to the following analyses:

(1) Analysis of X-ray diffraction crystal structure: using X-ray diffraction (XRD, D8 DISCOVER with GADDS, Brucker AXS Gmbh, Karlsruhe, Germany) to measure the crystal structure of the products of Example 1 and Comparative Examples 1 to 3. The light source was CuKα radiation source, the wavelength was 1.5418 Å, and the measured diffraction angle (2θ) ranges from 20° to 80°. As shown in the analysis results of FIG. 2, all samples have three characteristic peaks with high intensities, which were located at 44.5°, 51.8° and 76.4°, respectively, and the corresponding crystal planes were (111), (200), and (220) from the nickel foam substrate (JCPDS #50-1791), rather than the characteristic peaks of the prepared materials. More specifically, other peaks with relatively small intensities were characteristic peaks of the synthesized samples, and the structure corresponding to these peaks was Ni(OH)$_2$ (JCPDS #22-0444), which was marked as "$" in FIG. 2. In addition, the Fe-containing sample had a characteristic peak at 28.5° which belonged to the (003) crystal plane of FeOOH (JCPDS #46-1315) and was marked as "&" in FIG. 2. According to the analysis results of the aforementioned XRD, the main structure of the four samples was Ni(OH)$_2$ with low crystallinity. The samples containing Fe were further doped with a structure of FeOOH, while the structure was not changed by the doping of Co and S.

Figure 3:
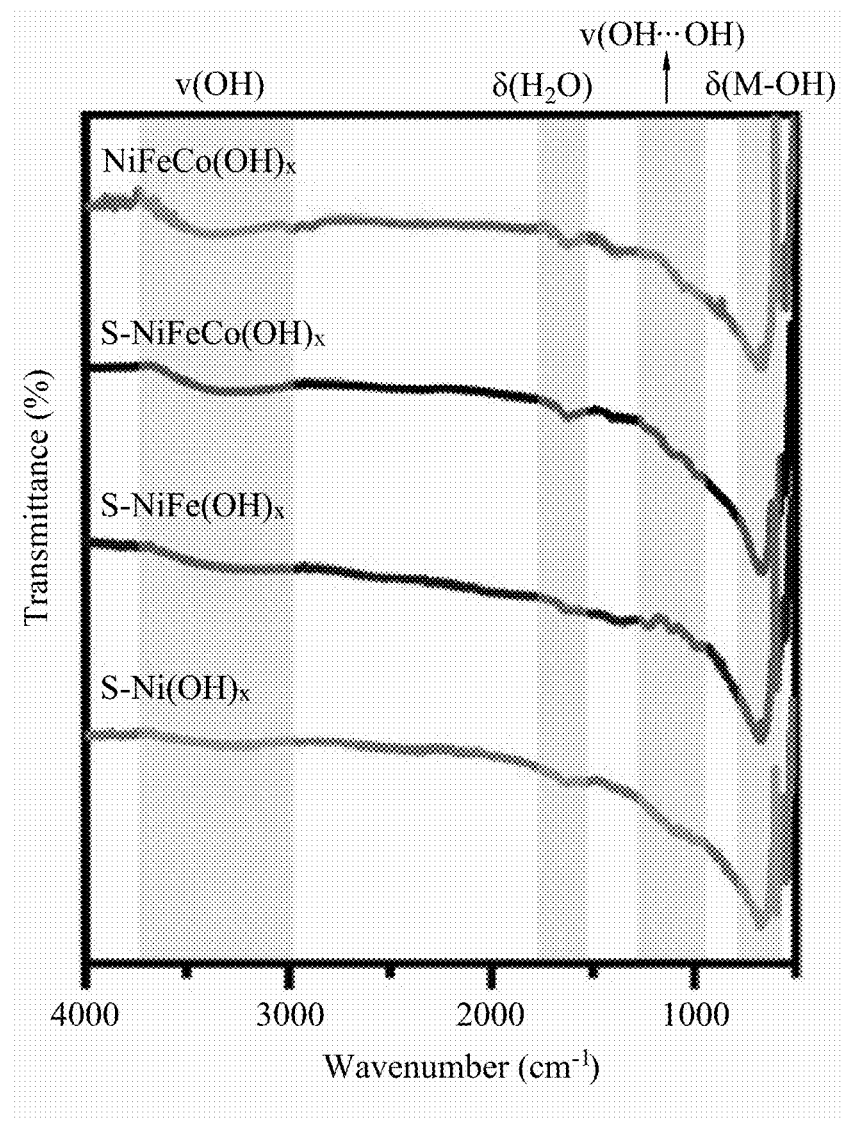
FIG. 3 is a Fourier-transform infrared spectroscopy (FTIR) diagram of Example 1 and Comparative Examples 1 to 3 of the present disclosure.

(2) Analysis of Fourier-transform infrared spectroscopy: using a Fourier transform infrared spectrometer (FTIR, PerkinElmer Frontier) to analyze the molecular structures of the products of Example 1 and Comparative Examples 1 to 3. As shown in FIG. 3, the broad peak between 2980 to 3750 cm$^{-1}$ was the stretching vibration of the O—H hydroxyl group (v(OH)) in the metal hydroxides; the peak at 1624 cm$^{-1}$ corresponds to the bending vibration of $H_2O$ (δ($H_2O$)); the peak around 1100 cm$^{-1}$ was the vibration of the hydrogen bond between the O—H hydroxyl group in the hydroxides and the O—H hydroxyl group in the adjacent hydroxides ((vOH•••HO)); the peak of 680 cm$^{-1}$ was the bending vibration of the metal-OH bond (δ(M-OH)) in the hydroxides; and the peak at 1380 cm$^{-1}$ in a specific sample belonged to the stretching vibration of the nitrate ion $NO_3^-$ from the metal nitrate precursors. The structure of the metal hydroxides in the urea oxidation catalyst of the present disclosure could be further confirmed according to the aforementioned FTIR analysis results.

Figure 4A:
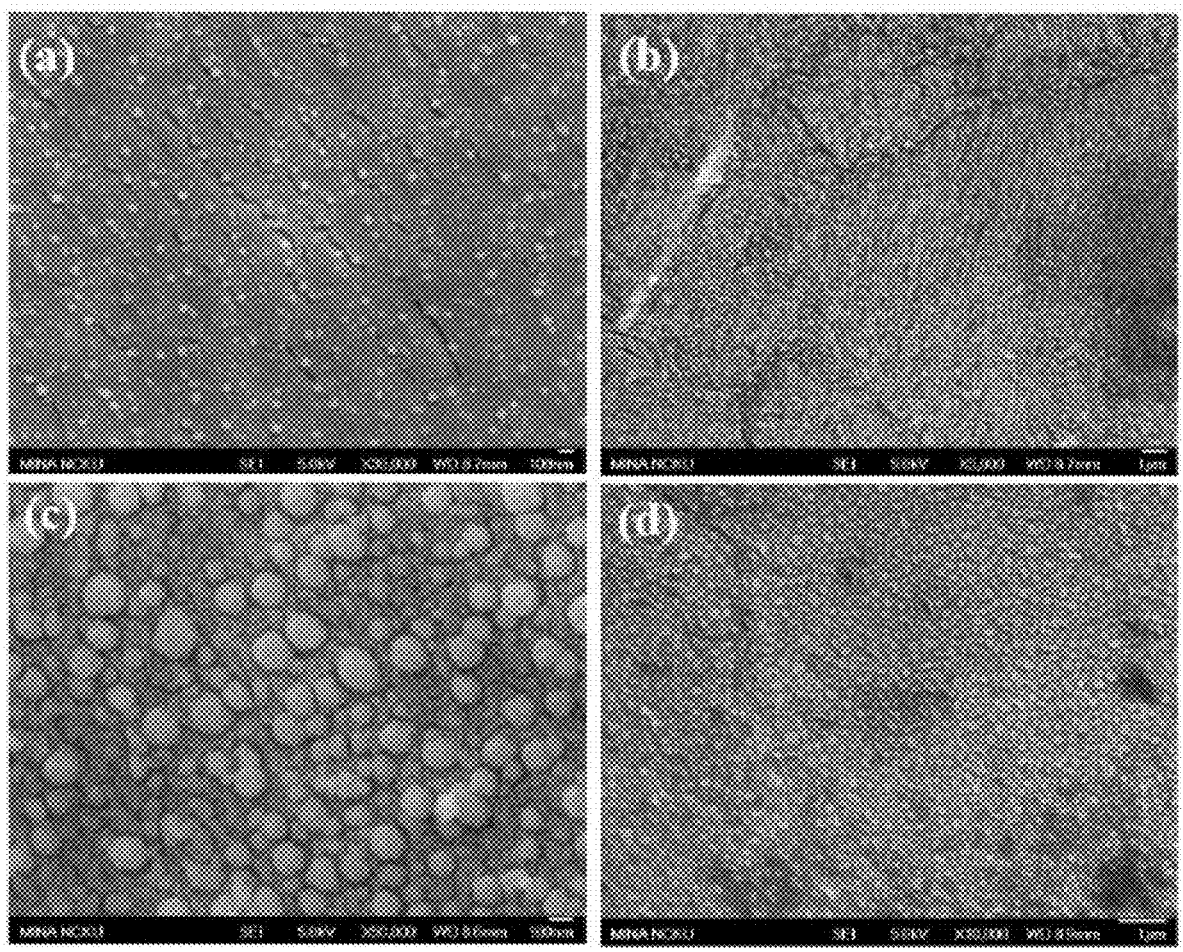
FIGS. 4A and 4B are surface topographies of Example 1 and Comparative Examples 1 to 3 of the present disclosure observed by a scanning electron microscope (SEM).

(3) Analysis of scanning and transmission electron microscope: the surface morphology of the products of Example 1 and Comparative Examples 1 to 3 was observed by a scanning electron microscope (SEM, 6710F of JEOL). As shown in FIG. 4, the surface morphology of (a)(b) NiFeCo (OH)$_x$ (i.e., the Comparative Example 1) was a smooth flake covering the nickel foam, and the nanoparticles were scattered on the flake. Compared to (a)(b), the surface morphology of (c)(d) S—NiFeCo(OH)$_x$ (i.e., Example 1) was a smooth flake densely and uniformly covered by the nanoparticles, and the diameter of the sphere formed by the nanoparticles was about 50 to 200 nm. It can be clearly seen that the sphere was composed of numerous nanoparticles with identical size, which were in the shape of fluffy balls. Although FIG. 4A showed that both the samples of Example 1 and Comparative Example 1 had similar nanoparticle sizes, Comparative Example 1 (NiFeCo(OH)$_x$) was not uniformly and densely covered on the flat flake as shown in Example 1 (S—NiFeCo(OH)$_x$) and was not accumulated and aggregated into a spherical shape, either. It was suggested that the cause was the slower growth rate of the nanoparticles in Comparative Example 1.

Figure 4B:
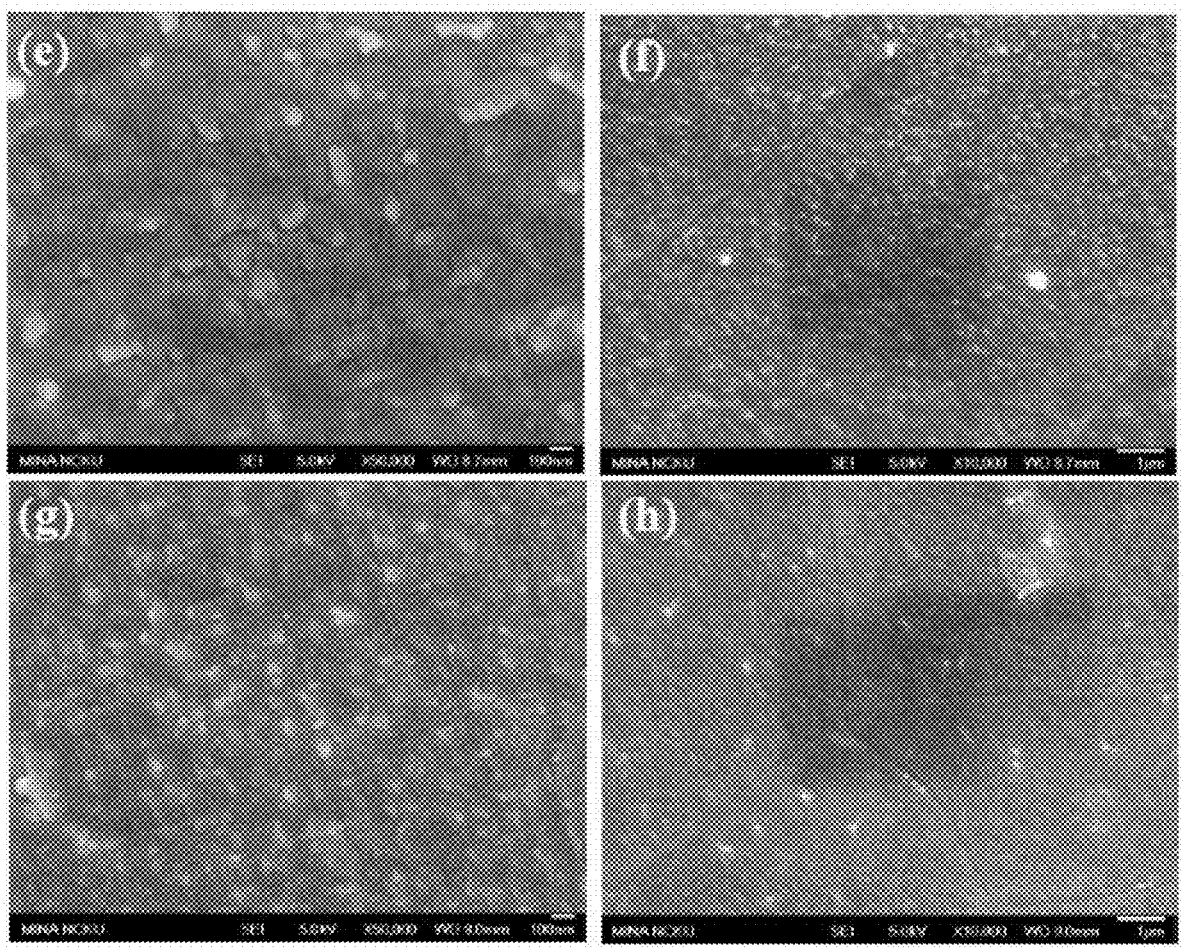

From the SEM results, Example 1 (S—NiFeCo(OH)$_x$) had a high surface area, which allowed more active sites to be exposed, thereby promoting the catalytic reaction. In addition, FIG. 4B showed that (e)(f) S—NiFe (OH)$_x$ (i.e., Comparative Example 2) and S—NiFeCo (OH)$_x$ had similar morphology, and some accumulation of particles could be seen. However, no spheres with the same size as S—NiFeCO(OH)$_x$ formed in S—NiFe (OH)$_x$. (g)(h) S—Ni (OH)$_x$ (i.e., Comparative Example 3) was completely, flatly, and uniformly covered by multiple nanoparticles, and no flat flakes could be observed as shown in the above samples.

Figure 5:
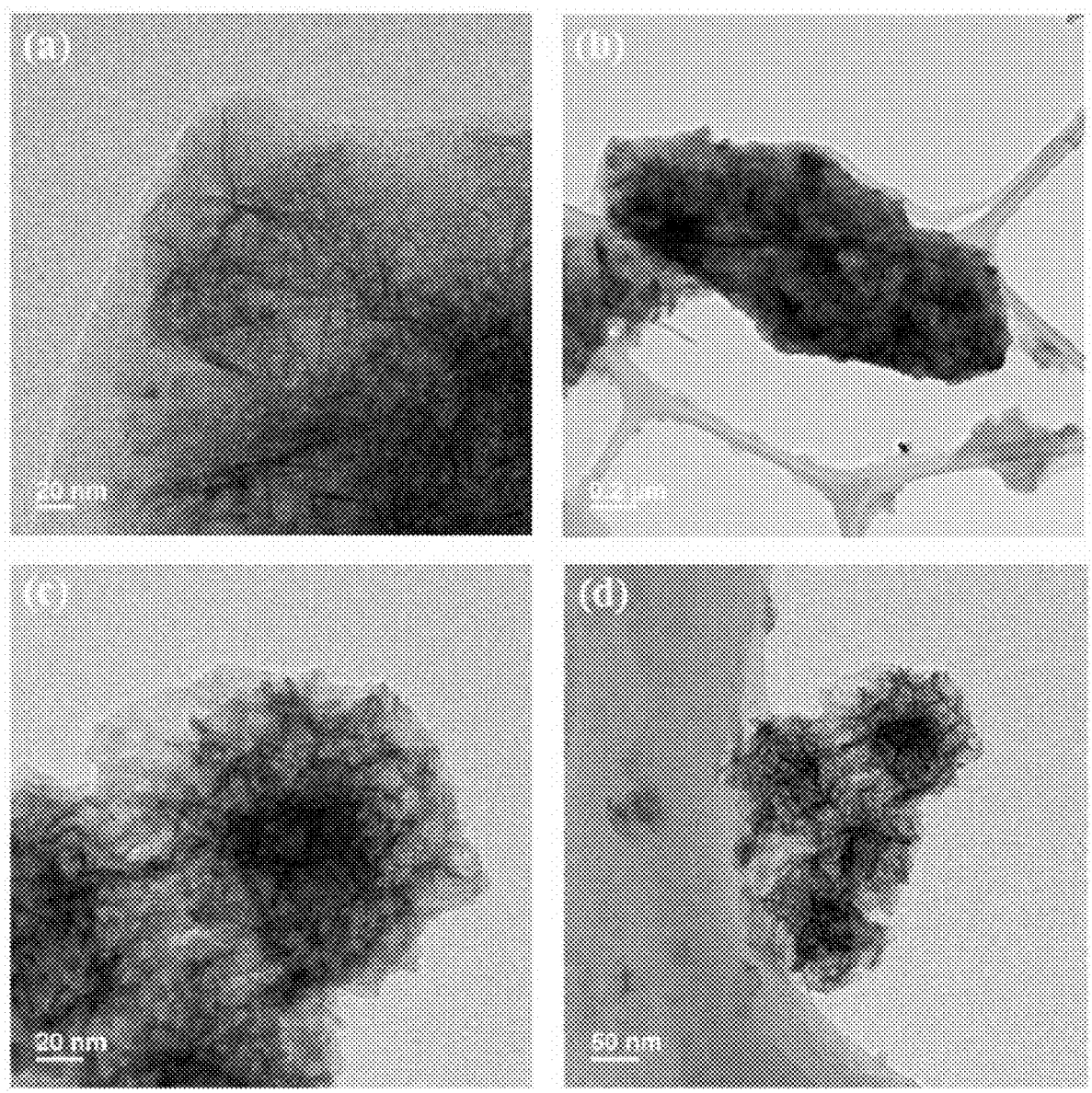
FIG. 5 is a morphological view of Comparative Example 1 and Example 1 of the present disclosure observed by a transmission electron microscope (TEM).

Using the images obtained from a transmission electron microscope (TEM, JEOL JEM-2100F) for observing the internal morphology of the products of Example 1 and Comparative Examples 1 to 3. For testing, the products of Example 1 and Comparative Examples 1 to 3 were cut into samples with a size of 0.05 mm in diameter and poured into a solution with 99.5% high-purity alcohol. Then, ultrasonic vibration was performed to shake the product formed on the nickel foam into the solution, and the solution was dropped onto a carbon-coated copper mesh and placed in a vacuum oven at 60° C. for drying to obtain a sample for TEM analysis. From the results shown in FIG. 5, it could be seen that (a)(b) NiFeCo(OH)$_x$ (ie, Comparative Example 1) was in the form of flakes and the internal shape was like a flower; in (c)(d) S—NiFeCo(OH)$_x$ (i.e., Example 1), only micrometer-scale spheres with the same sphere diameter as in FIG. 4A were observed, and the internal morphology of the spheres was similar to that of NiFeCo(OH)$_x$ (Comparative Example 1), which looked like a flower. The TEM shown in FIG. 5 did not capture the part of the flat flakes, which was because the material synthesized in the present disclosure (metal hydroxides or sulfur-doped metal hydroxide) was directly grown on the nickel foam substrate, and the TEM sample as mentioned above was ultrasonically vibrated. It was speculated that most of the spheres fell from the flake, and thus only the spheres were photographed by TEM.

Figure 6:
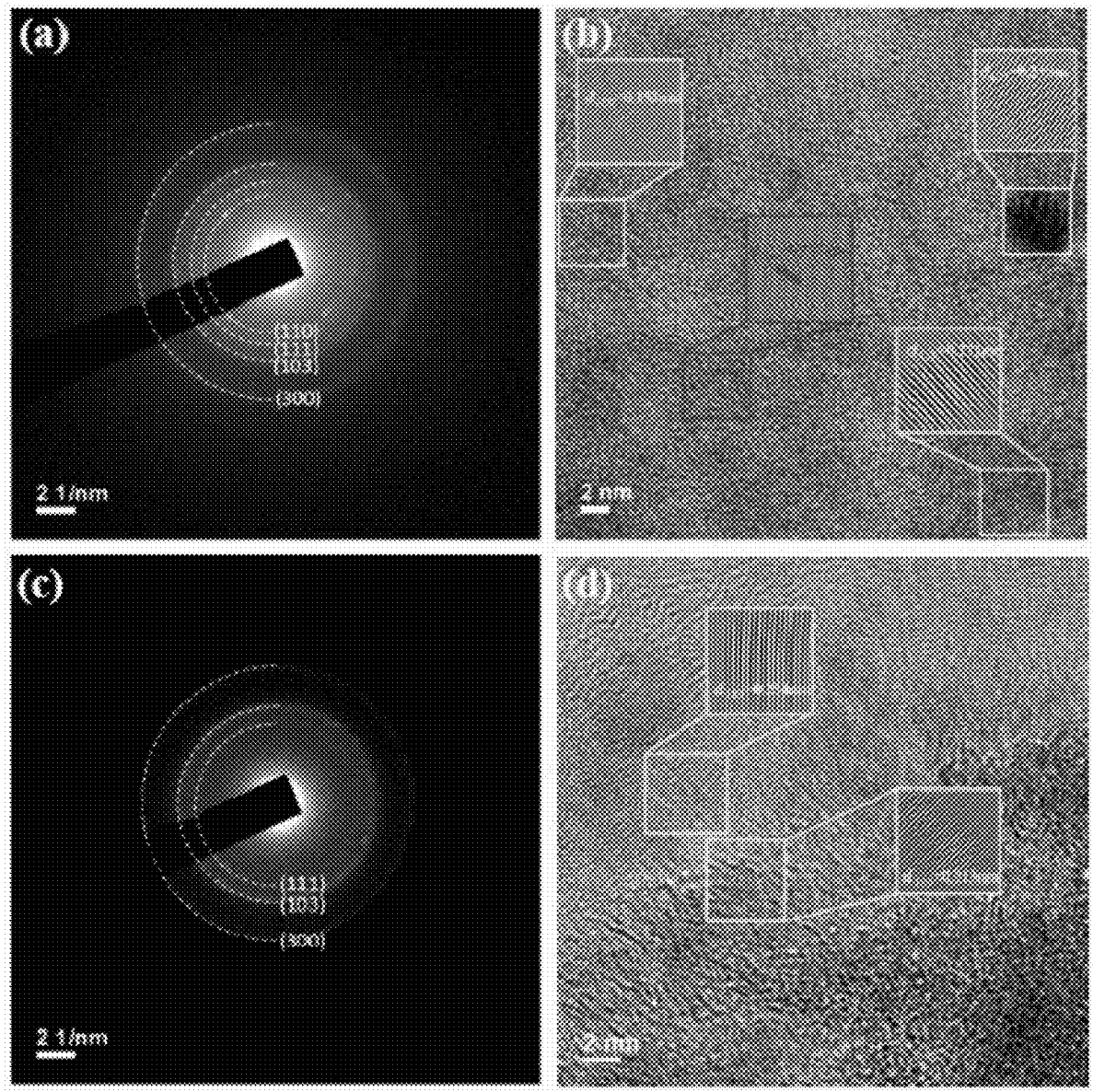
FIG. 6 is a diagram of the selected area electron diffraction (SAED) of Comparative Example 1 and Example 1 of the present disclosure and the microscopic morphology observed by a high-resolution transmission electron microscope (HRTEM).

The microscopic morphology of the samples and the crystal structure of the samples were determined by using a high-resolution transmission electron microscopy (HRTEM) and a selected area electron diffraction (SAED). As shown in FIG. 6, the SAED of (a) NiFeCo(OH)$_x$ corresponded to a diffraction ring of Ni(OH)$_2$ structure (JCPDS #22-0444), which was consistent with the XRD pattern. The diffraction rings shown were respectively (110), (111), (103) and (310) crystalline phases, while the lattice fringes with a lattice spacing of 0.271 nm corresponding to the (110) plane, the lattice fringes with a lattice spacing of 0.21 nm corresponding to the (103) plane, and the lattice fringes with a lattice spacing of 0.153 nm corresponding to the (300) plane were found in the HRTEM image of (b) NiFeCo(OH)$_x$. In addition to the above-mentioned lattice fringes belonging to the Ni(OH)$_2$ structure (white square blocks), the lattice fringes belonging to the metallic phase (JCPDS #49-1658) corresponding to the (200) plane (dark gray square blocks) with the lattice spacing of 0.177 nm was also found. From the position distribution of the lattice fringes, the three lattice fringes belonging to the Ni(OH)$_2$ structure were only distributed in small blocks, while the lattice fringes belonging to the metal phases have a wider distribution. Corresponding to the SEM surface morphology of NiFeCo(OH)$_x$, it was suggested that the flat flakes covering the nickel foam substrate were metal phase structures, the nanoparticles formed thereon were the structures of hydroxides, and the crystallinity was not high.

FIG. 6 further shows (c) SAED and (d) HRTEM images of S—NiFeCo(OH)$_x$, the SAED image shows the same Ni(OH)$_2$ (JCPDS #22-0444) structure corresponding to NiFeCo(OH)$_x$, but only the diffraction rings of the (111), (103) and (310) planes appeared. The lattice fringes with a lattice spacing of 0.254 nm corresponding to (111) plane and the lattice fringes with a lattice spacing of 0.213 nm corresponding to (103) plane were obtained from the HRTEM image, which were similar to NiFeCo(OH)$_x$ lattice fringes belonging to Ni(OH)$_2$. It can be seen from the above that the nanoparticles forming the spheres have the structure of hydroxides, which was the same crystal structure as that of the nanoparticles of NiFeCo(OH)$_x$, the crystallinity was not high, and the doping of sulfur does not change the crystal structure.

Figure 7:
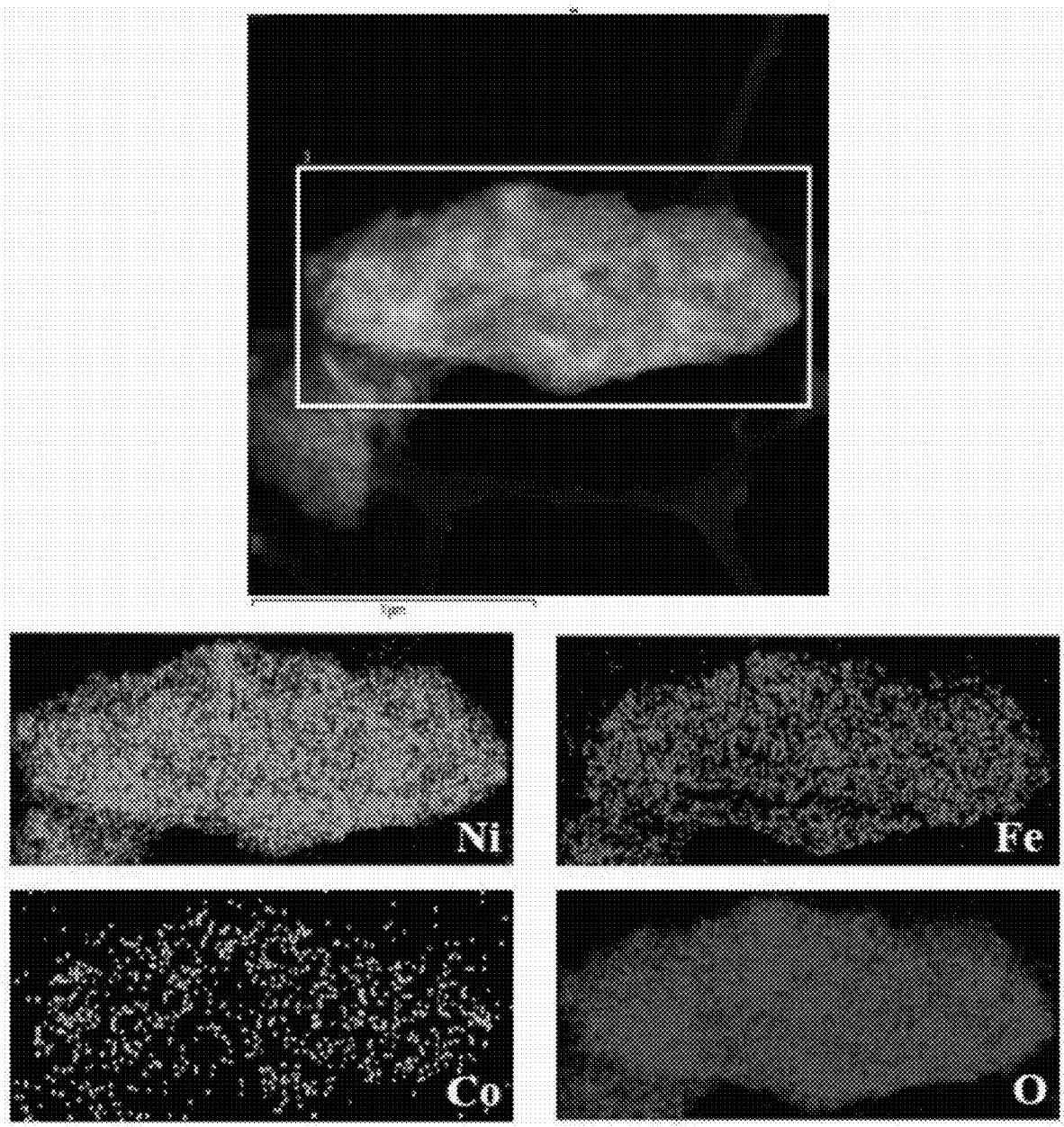
FIGS. 7 and 8 are the high-angle annular dark field detector (HAADF-STEM) and mapping diagrams of Comparative Example 1 and Example 1 of the present disclosure, respectively.

Using a scanning transmission high-angle annular dark field image detector (HAADF-STEM) and an X-ray energy dispersive analyzer (EDS) to determine the morphology of the samples and to observe the distribution of each element. FIG. 7 is the HAADF-STEM and mapping image of NiFeCo (OH)$_x$ from Comparative Example 1, which could be confirmed again that it has flakes and an internal flower-like shape, and the elements of Ni, Fe, Co, and O were uniformly distributed from the observation of the mapping image.

Figure 8:
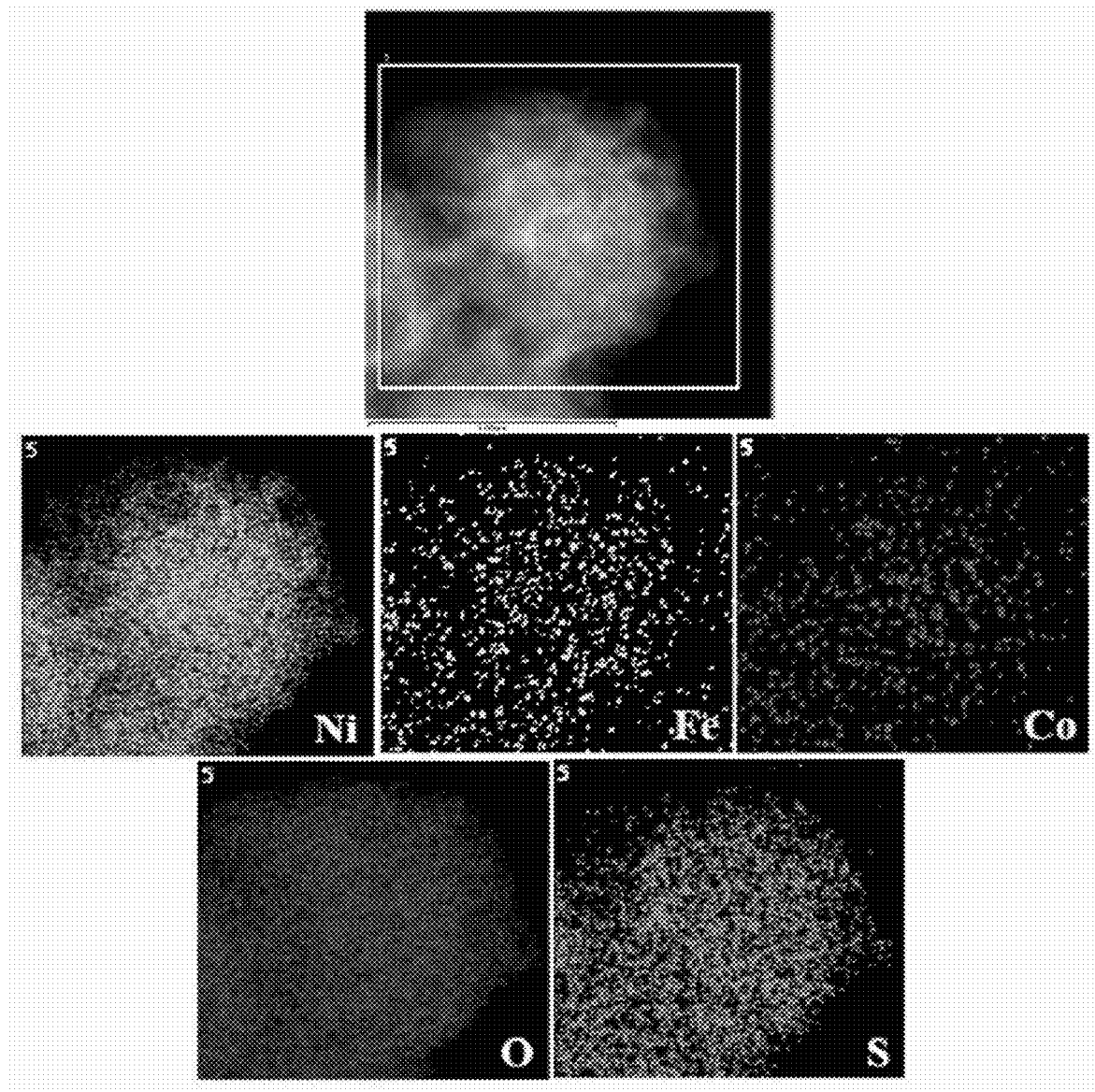

FIG. 8 shows the HAADF-STEM and EDS maps of the S—NiFeCo(OH)$_x$ of Example 1. The spherical shape composed of numerous nanoparticles and the internal flower-like morphology can be seen in FIG. 8, and each element of Ni, Fe, Co, O, and S in this sphere was also observed as being uniformly distributed. Meanwhile, sulfur was indeed present in S—NiFeCo(OH)$_x$. In particular, S—NiFeCo(OH)$_x$ in Example 1 has 29 element % of the Ni, 1.3 element % of the Fe, 0.5 element % of the Co, 8.3 element % of the S, and 60.9 element % of the O, respectively.

(4) X-ray photoelectron spectroscopy analysis: using an X-ray photoelectron spectroscopy (XPS, Versaprobe PHI 5000) to analyze the bonding of each element, and to further analyze the changes in bonding of multiple metals and sulfur doping.

Figure 9B:
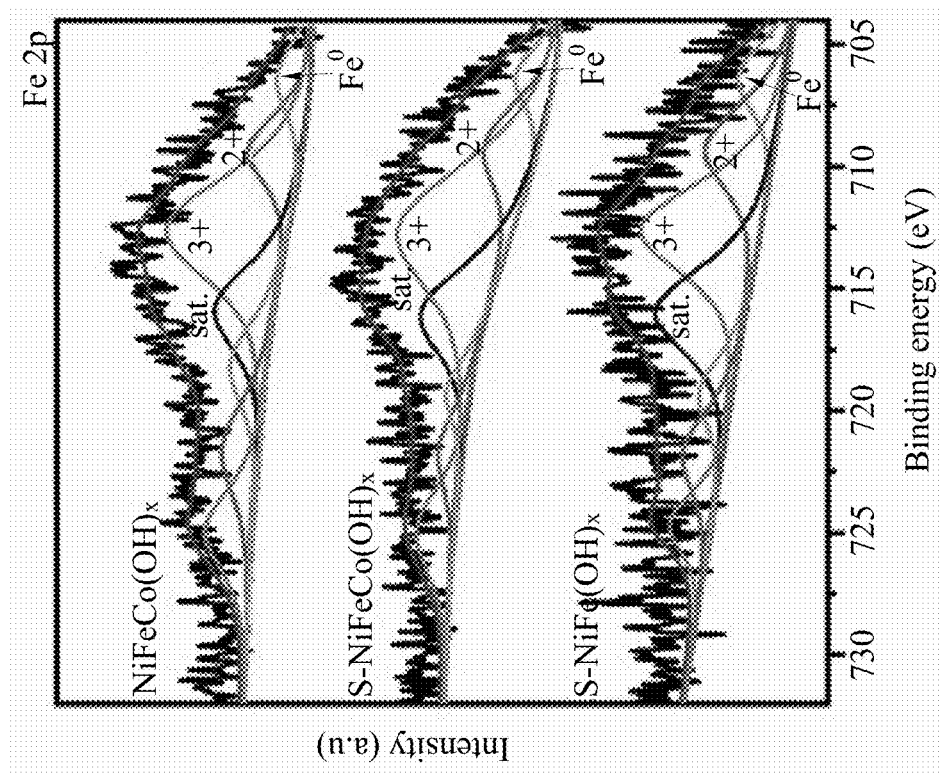
FIGS. 9A to 9E present X-ray photoelectron spectroscopy (XPS) of each element of Example 1 and Comparative Examples 1 to 3 of the present disclosure.
Figure 9A:
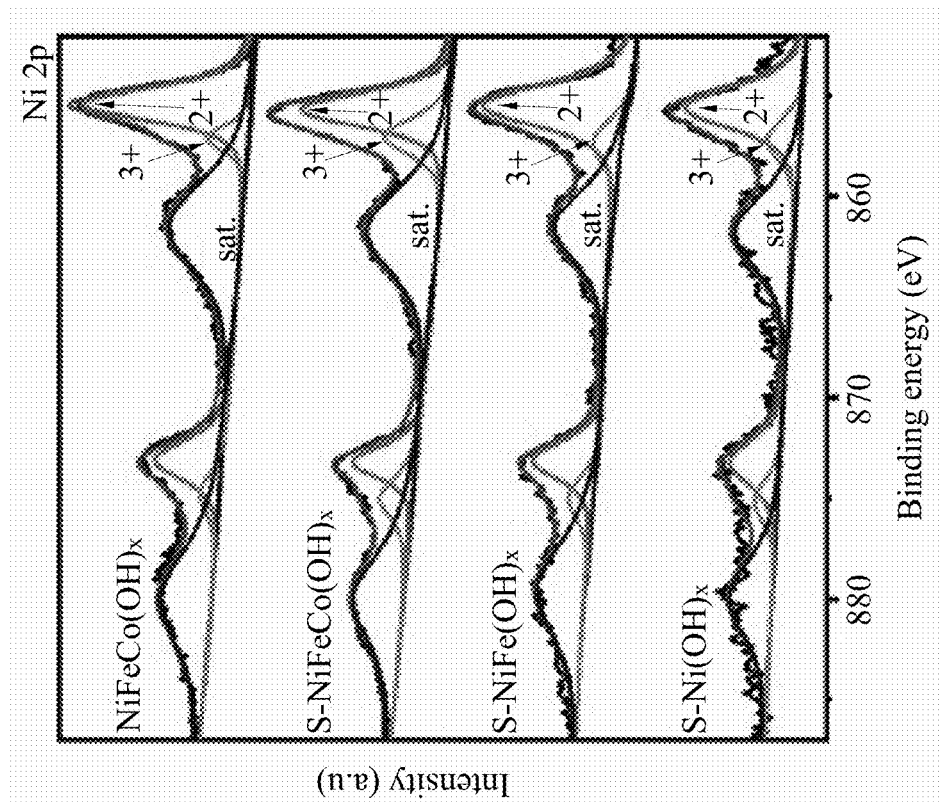
Figure 9D:
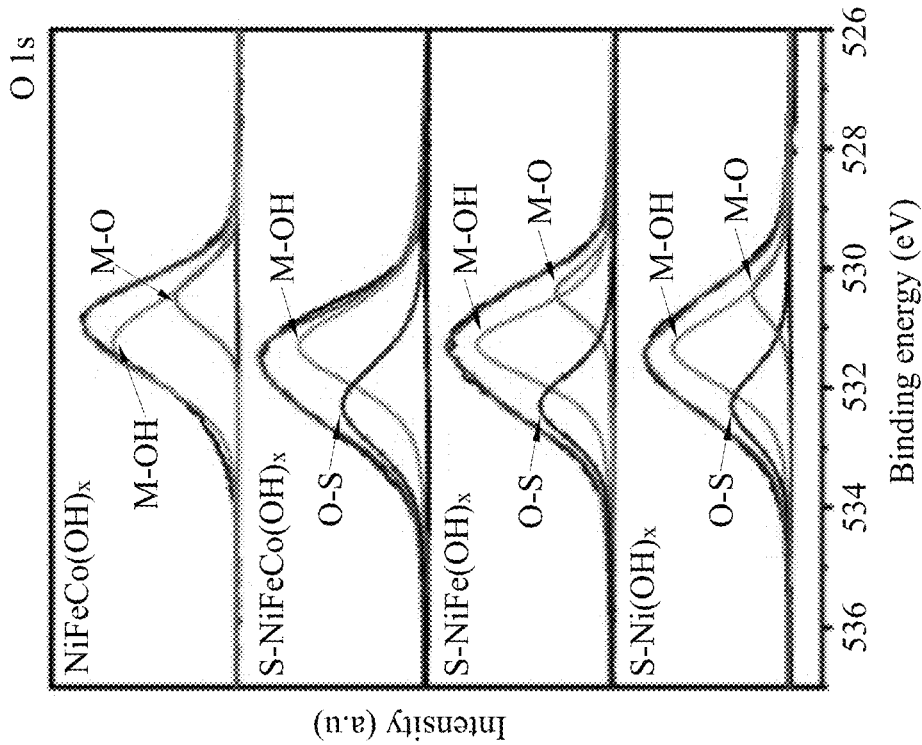
Figure 9C:
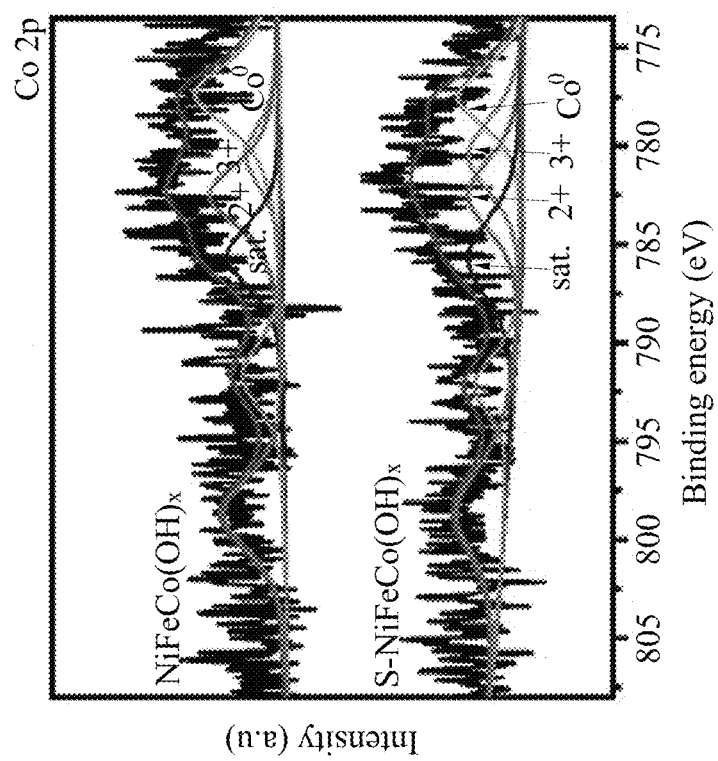
Figure 9E:
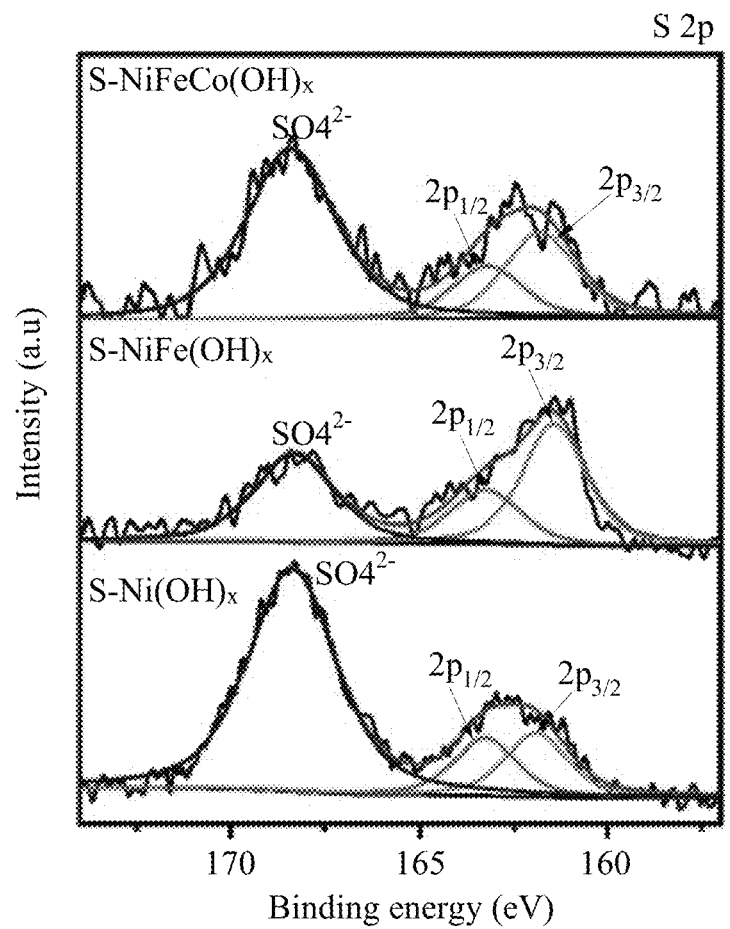

Elemental analysis XPS spectra of all samples were presented in FIGS. 9A to 9E. In order to better understand and compare the elemental bonding changes of different samples, the area ratios of each characteristic peak were calculated and listed in Tables 1 to 5. In the Ni 2p spectrum shown in FIG. 9A, the peaks located at 855.5 eV (Ni $2p_{3/2}$) and 857.3 eV (Ni $2p_{1/2}$) belong to $Ni^{2+}$; the peaks located at 857.3 eV (Ni $2p_{3/2}$) and 875 eV (Ni $2p_{1/2}$) belongs to $Ni^{3+}$; and two satellite peaks located at 861.5 eV and 879.5 eV, respectively. In the Fe 2p spectrum shown in FIG. 9B, the characteristic peaks of metallic iron $Fe^0$ were located at 706.4 eV (Fe $2p_{3/2}$) and 719.2 eV (Fe $2p_{1/2}$) respectively; the peaks at 709.3 V (Fe $2p_{3/2}$) and 721.7 eV (Fe $2p_{1/2}$) belong to $Fe^{2+}$; the peaks at 712.5 (Fe $2p_{3/2}$) and 724.6 eV (Fe $2p_{1/2}$) belong to $Fe^{3+}$; and the satellite peaks appear around 715.9 eV. In the Co 2p spectrum shown in FIG. 9C, the peaks located at 777.7 eV (Co $2p_{3/2}$) and 792.4 eV (Co $2p_{1/2}$) correspond to the metallic cobalt $Co^0$; the peaks at 779.7 eV (Co $2p_{3/2}$) and 798.5 eV (Co $2p_{1/2}$) belong to $Co^{3+}$; the peak at 782.2 eV (Co $2p_{3/2}$) belongs to $Co^{2+}$; and the satellite peak was at 785.7 eV. FIG. 9D shows the O is spectrum as a broad peak consisting of M-O at 530.4 eV, M-OH at 531.3 eV, and O—S at 532.3 eV. In the S 2p XPS spectrum shown in FIG. 9E, the peaks at 161.8 eV (S $2p_{3/2}$) and 163.2 eV (S $2p_{1/2}$) belonged to M-S, while the peak at 167.8 eV was $S_4^{2-}$, that is, the S—O bond. The M marked in FIGS. 9D and 9E represents a metal.

TABLE 1

The valence ratio of Ni $2p_{3/2}$ XPS of all samples

| ID | Ni 2p_{3/2} | | |
|---|---|---|---|
| | $Ni^0$ | $Ni^{2+}$ | $Ni^{3+}$ |
| NiFeCo(OH)$_x$ | 0.0 | 84.8 | 15.2 |
| S—NiFeCo(OH)$_x$ | 0.0 | 68.1 | 31.9 |
| S—NiFe(OH)$_x$ | 0.0 | 83.7 | 16.3 |
| S—Ni(OH)$_x$ | 0.0 | 77.9 | 22.1 |

TABLE 2

The valence ratio of Fe $2p_{3/2}$ XPS of all samples

| ID | Fe 2p_{3/2} | | |
|---|---|---|---|
| | $Fe^0$ | $Fe^{2+}$ | $Fe^{3+}$ |
| NiFeCo(OH)$_x$ | 12.8 | 20.6 | 66.6 |
| S—NiFeCo(OH)$_x$ | 11.1 | 22.2 | 66.7 |
| S—NiFe(OH)$_x$ | 17.0 | 30.0 | 52.9 |

TABLE 3

The valence ratio of Co $2p_{3/2}$ XPS of all samples

| ID | Co 2p_{3/2} | | |
|---|---|---|---|
| | $Co^0$ | $Co^{3+}$ | $Co^{2+}$ |
| NiFeCo(OH)$_x$ | 47.8 | 15.8 | 36.4 |
| S—NiFeCo(OH)$_x$ | 31.9 | 34.3 | 33.8 |

TABLE 4

The valence ratio of O 1s XPS of all samples

| ID | O 1s | | |
|---|---|---|---|
| | M-O | M-OH | O—S |
| NiFeCo(OH)$_x$ | 21.6 | 78.4 | 0.0 |
| S—NiFeCo(OH)$_x$ | 0.0 | 54.3 | 45.7 |
| S—NiFe(OH)$_x$ | 16.8 | 54.5 | 28.7 |
| S—Ni(OH)$_x$ | 13.0 | 58.2 | 28.7 |

TABLE 5

The valence ratio of S 2p XPS of all samples

| ID | S 2p | | |
|---|---|---|---|
| | M-S ($2p_{3/2}$) | M-S ($2p_{1/2}$) | $SO_4^{2-}$ |
| S—NiFeCo(OH)$_x$ | 23.7 | 14.9 | 61.4 |
| S—NiFe(OH)$_x$ | 39.0 | 22.9 | 38.1 |
| S—Ni(OH)$_x$ | 15.0 | 13.5 | 71.5 |

From the Ni 2p spectrum shown in FIG. 9A, all samples were mainly $Ni^{2+}$. Since $Ni^{3+}$ was the active point of UOR, the samples with more $Ni^{3+}$ will have better UOR performance, wherein S—NiFeCo(OH)$_x$ (Example 1) has the highest $Ni^{3+}$ ratio. It could be seen from the Fe 2p spectrum shown in FIG. 9B that the samples obtained in Example 1 and Comparative Examples 1 and 2 were mainly $Ni^{3+}$ and have metallic iron $Fe^0$. In addition, comparing the sample of binary metal (Comparative Example 2) with the samples of ternary metal (Example 1 and Comparative Example 1), an obvious positive shift could be seen, which indicates that the high valence state $Fe^{3+}$ will be increased after adding Co. Moreover, NiFeCo(OH)$_x$ (Comparative Example 1) produces more metallic iron than S—NiFeCo(OH)$_x$ (Example 1). It could be seen from the Co 2p spectrum (FIG. 9C) that the samples of Example 1 and Comparative Example 1 have the same formation of metallic cobalt, and the content of metallic cobalt $Co^0$ presents the same trend as that of metallic iron $Fe^0$, that is, both of which were more in NiFeCo(OH)$_x$ (Comparative Example 1). It was indicated that the surface of NiFeCo(OH)$_x$ has more iron and cobalt metal phases, while S—NiFeCo(OH)$_x$ (Example 1) has a higher proportion of $Co^{3+}$, which was due to the tendency of the electrons toward S and away Co after doping with S with high electronegativity. Since high-valence $Fe^{3+}$ and $Co^{3+}$ were beneficial to the adsorption of $OH^-$ in the UOR process for promoting the catalytic reaction, higher contents of $CO^{3+}$ in the active sites could improve the UOR performance. Furthermore, the synergistic effect of $Ni^{2+}$ and $Co^{3+}$ could further enhance the UOR catalytic reaction. In the O 1s spectrum of FIG. 9D, all samples were dominated by M-OH, which represents the formation of hydroxides. In addition, comparing the spectra of sulfur-doped samples (Example 1 and Comparative Examples 2 and 3) and samples without sulfur (Comparative Example 1), the O—S bonds appear in the sulfur-doped samples, and therefore the partial area of M-OH was substituted with the O—S bonds. The corresponding S—O peak was also found from the S 2p spectrum of FIG. 9E, indicating that the sulfur in the sample was oxidized to form sulfate and existed in this form. On the other hand, the presence of M-S bonds in the S 2p spectrum of FIG. 9E indicated that sulfide ions replace O in the metal hydroxides entering into the material structure. Therefore, it could be confirmed from the O and S spectra that the sulfur successfully enters the material lattice and was partially oxidized to sulfate. Since the replacement of the larger S ions for the original positions of O contributes to the expansion of the lattice spacing, the ion diffusion efficiency during the UOR reaction could be improved, thereby increasing the UOR reaction rate.

In order to confirm the formation of the metal phases, an XPS depth analysis was further performed, and the depths of the surface of 50 nm, 100 nm, 150 nm, and 200 nm were measured respectively. FIGS. 10A to 10D show the XPS depth analysis plots of each element (i.e., Ni, Fe, Co, and S) of (a) $NiFeCo(OH)_x$ and (b) $S—NiFeCo(OH)_x$, respectively, and the metal phase ratios obtained from each depth were summarized in Tables 6 to 8. Specifically, according to the Ni 2p spectrum shown in FIG. 10A, the peaks located at 853 eV (Ni $2p_{3/2}$) and 870 eV (Ni $2p_{1/2}$) belong to the characteristic peaks of metallic nickel $Ni^0$, and the peaks located at 858.8 eV were characteristic satellite peaks of $Ni^0$. On the surface, both of them were mainly $Ni^{2+}$, and there was no peak of metallic nickel. In the depth of 50 nm, the $Ni^0$ of (a) $NiFeCo(OH)_x$ increases greatly, while $Ni^{2+}$ decreases sharply, and $Ni^{3+}$ disappears. By contrast, (b) $S—NiFeCo(OH)_x$ could further see a certain concentration of $Ni^{2+}$ and $Ni^{3+}$, and $Ni^{3+}$ disappears completely until the depth of 150 nm. It was presumed that the hydroxides of $S—NiFeCo(OH)_x$ grows faster, and the resulting thickness was thicker, the same as the sphere of about 100 to 150 nm shown by the SEM in FIG. 4A. In addition, the higher valence of Ni almost disappears until the depth of 150 nm, whereas $Ni^{2+}$ still remains until 200 nm, which confirms the rapid oxidation of NiO. The metal peaks do not fluctuate much with depth, which is presumed to be the signal of the metal nickel substrate. In the Fe 2p spectrum shown in FIG. 10B, $NiFeCo(OH)_x$ and $S—NiFeCo(OH)_x$ have the same trend, the proportion of metal phase is lower at the surface, and the proportion of metal iron increases when the depth becomes deeper, which represent more metallic phase in the deep than which on the surface. From the Co 2p spectrum in FIG. 10C, the proportion of the metallic phase was higher when the depth was deeper. Therefore, from the depth XPS analysis, it was known that more iron and cobalt in the metallic phase were formed in the depth, and the metallic phases were decreased toward the surface, while the hydroxides were increased. In other words, the results of depth XPS analysis and TEM analysis, inferred the bottom being the metal phase and the upper layer being hydroxides, were consistent with each other. At the same time, the doping of sulfur could accelerate the process reaction and generate more hydroxides.

TABLE 6 metal $Ni^0$ phase ratio at each depth of $NiFeCo(OH)_x$ and $S—NiFeCo(OH)_x$

| depth | Ratio of $Ni^0$ (%) | |
| --- | --- | --- |
| (nm) | $NiFeCo(OH)_x$ | $S—NiFeCo(OH)_x$ |
| surface | 0.0 | 0.0 |
| 50 | 70.0 | 35.7 |
| 100 | 73.7 | 55.7 |
| 150 | 79.1 | 76.0 |
| 200 | 80.2 | 77.4 |

TABLE 7 metal $Fe^0$ phase ratio at each depth of $NiFeCo(OH)_x$ and $S—NiFeCo(OH)_x$

| depth | Ratio of $Fe^0$ (%) | |
| --- | --- | --- |
| (nm) | $NiFeCo(OH)_x$ | $S—NiFeCo(OH)_x$ |
| surface | 12.8 | 11.1 |
| 50 | 13.3 | 13.7 |
| 100 | 15.1 | 13.5 |
| 150 | 15.0 | 15.0 |
| 200 | 13.9 | 13.3 |

TABLE 8 metal $Co^0$ phase ratio at each depth of $NiFeCo(OH)_x$ and $S—NiFeCo(OH)_x$

| depth | Ratio of $Co^0$ (%) | |
| --- | --- | --- |
| (nm) | $NiFeCo(OH)_x$ | $S—NiFeCo(OH)_x$ |
| surface | 47.8 | 31.9 |
| 50 | 48.2 | 42.8 |
| 100 | 55.0 | 44.2 |
| 150 | 57.4 | 47.3 |
| 200 | 57.7 | 50.4 |

Figure 10A:
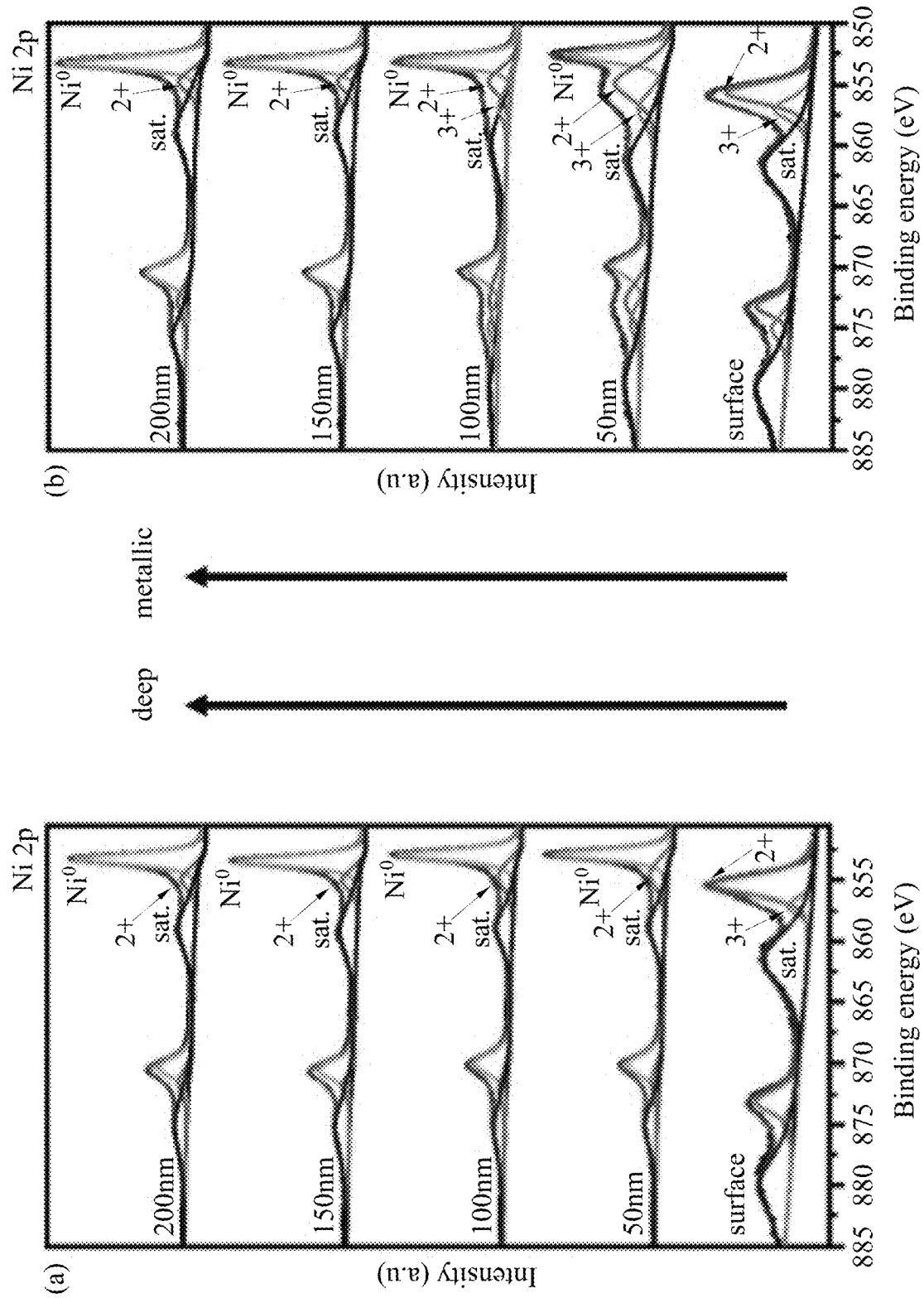
FIGS. 10A to 10D are XPS depth analysis diagrams of each element of Comparative Example 1 and Example 1 of the present disclosure.
Figure 10B:
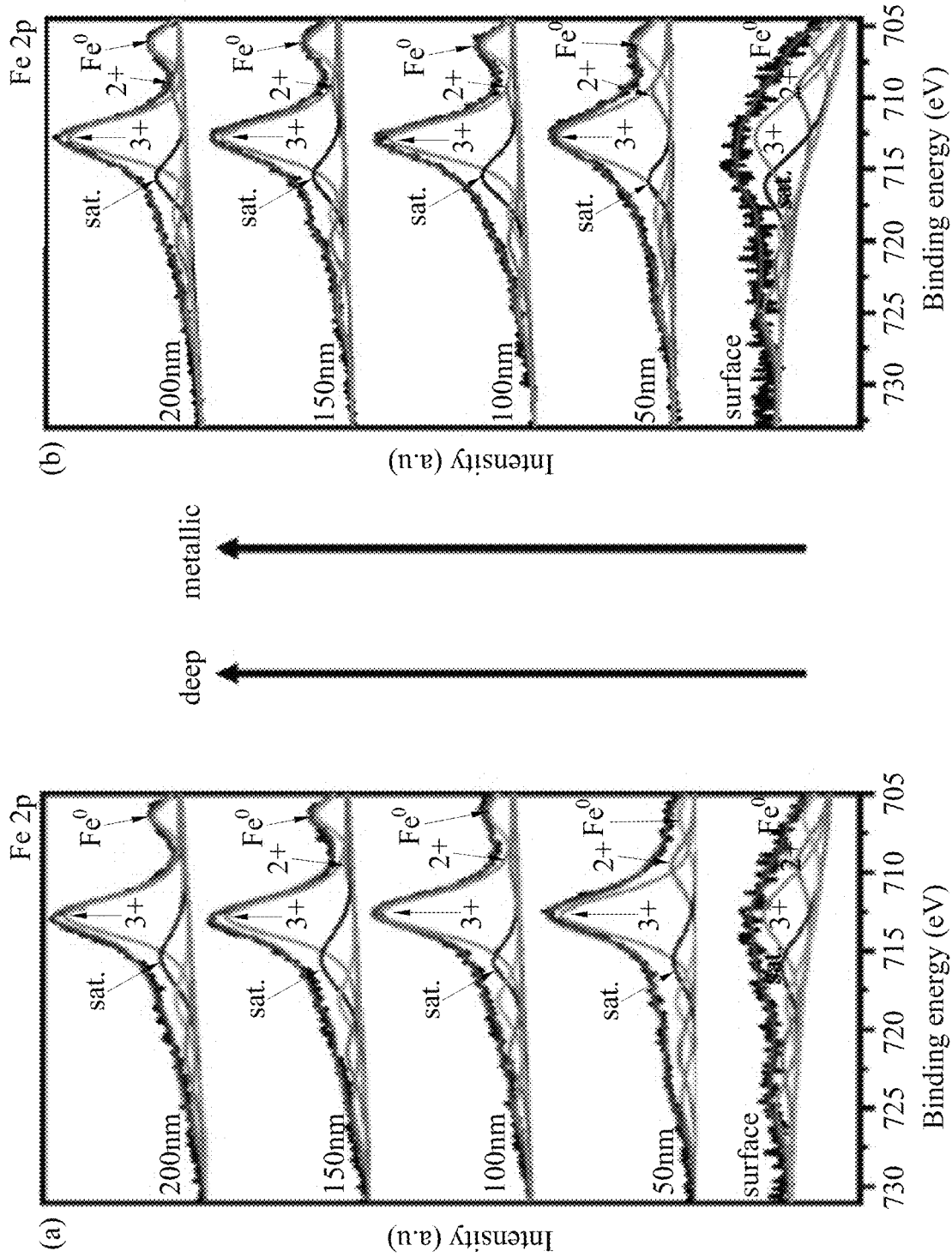
Figure 10C:
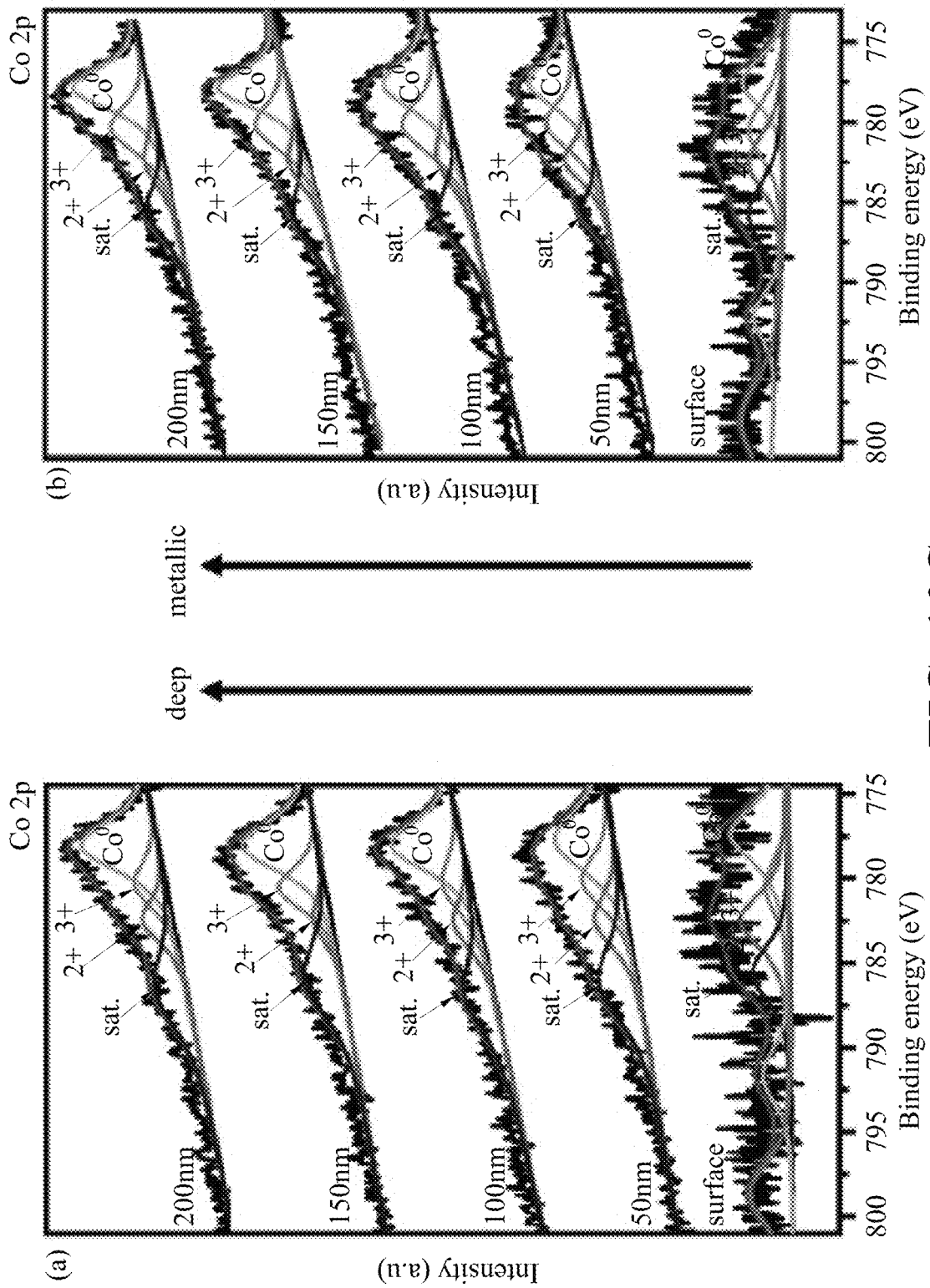
Figure 10D:
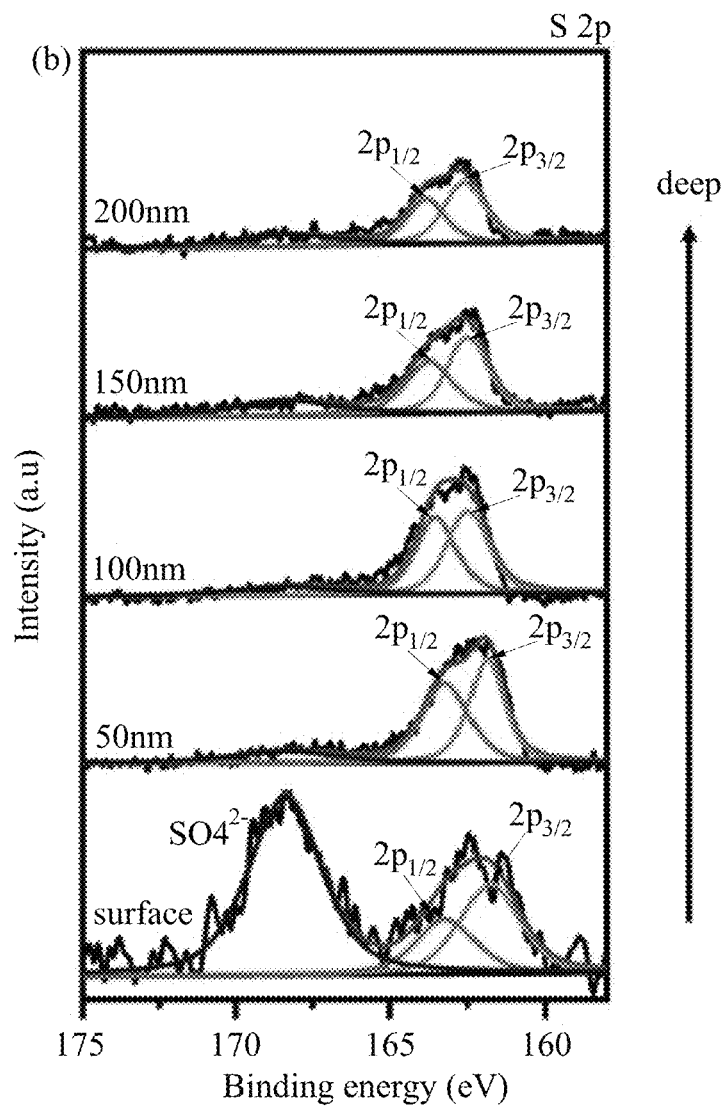

In addition, from the depth analysis spectrum of S 2p shown in FIG. 10D, it could be found that except for the surface, there was almost no $SO_4^{2-}$ at other depths. The appearance of $SO_4^{2-}$ was due to the sulfur oxidation on the surface, and M-S gradually becomes smaller as the depth goes deeper. It was thus suggested that sulfur was doped into the structure of the upper hydroxides.

The urea oxidation catalyst prepared by the present disclosure includes a metal coating on the metal substrate (i.e., nickel foam), and the produced metal hydroxides grow on the metal. Specifically, in the preparation method of the present disclosure, by adding a ferric nitrate precursor, and using $NO^{3-}$ and $Fe^{3+}$ in the reaction solution as oxidants, the nickel foam metal substrate was oxidized to $Ni^{2+}$ through the reduction reaction. In addition to acting as an oxidant, the hydrolysis of $Fe^{3+}$ increases the concentration of $H^+$ in the solution, and the sulfur precursor (i.e., thiourea $SC(NH_2)_2$) was also hydrolyzed to be sulfide ions, thereby $H^+$ was generated. Both of the aforementioned hydrolysis reactions could increase the concentration of $H^+$, accelerate the reduction reaction rate of $NO_{3-}$, and then accelerate the oxidation of metallic Ni to generate more $Ni^{2+}$. Thus, the preparation method of the present disclosure could accelerate the synthesis reaction by adding iron and sulfur.

In addition, the metal of Ni will undergo a replacement reaction in solutions containing different metal ions, and the $Fe^{2+}$ generated by the reduction of $Fe^{3+}$ as well as the $Co^{2+}$ in the metal nitrate precursors thus get electrons and were replaced by metals of Fe and Co that are directly grown on the metal substrate (nickel foam). The metal Co with lower activity tended to be reduced and replaced by metals compared with Fe, such that the metal of nickel was oxidized, and $Ni^{2+}$ is formed.

Also, oxygen dissolved in water undergoes oxygen reduction reaction (ORR) and hydrogen evolution reactions (HER). The $OH^-$ generated by the ORR reaction along with the $H^+$ consumed by the HER reaction may increase the pH of the solution near the surface where the metal Co and Fe generated as described above. The solution near the surface where the metal Co and Fe generated was rich in $OH^-$. In this environment, it was beneficial for the abundant metal ions and sulfur ions in the solution to react with OH⁻, thereby the sulfur-doped metal hydroxide was deposited and generated on the Fe—Co metal alloy.

In light of the above, the preparation method provided by the present disclosure was composed of a variety of reactions. $Fe^{3+}$ and $NO^{3-}$ were used as oxidants to corrode and oxidize metallic nickel to $Ni^{2+}$; the hydrolysis of thiourea and $Fe^{3+}$ accelerates the reduction reaction of $NO^{3-}$, and allowing more nickel foam to be oxidized to $Ni^{2+}$ and to participate in the synthesis; the nickel foam was replaced with metals of iron and cobalt formed on the surface of the metal substrate (i.e., nickel foam) through the replacement reaction of metals; and the occurrence of ORR increases the concentration of OH⁻, which promotes the formation of the sulfur-doped hydroxide.

S—NiFeCo(OH)$_x$ (Example 1) and NiFeCo(OH)$_x$ (Comparative Example 1) both form metal alloys, and the addition of the sulfur precursors (i.e., thiourea) could effectively accelerate the synthesis reaction and make S—NiFeCo (OH)$_x$ (Example 1) grow more nanoparticles of the hydroxides which were densely covered and accumulated like spheres on the metal alloy. Since the reaction solution of S—Ni(OH)$_x$ (Comparative Example 3) does not contain other metal ions, there was no metal replacement reaction, and no metal alloy was formed. Also, due to the lack of hydrolysis of $Fe^{3+}$ for accelerating the synthesis reaction, there were only nanoparticles of the hydroxides directly grown on the nickel foam substrate without accumulation.

In order to evaluate the UOR catalytic performance of the sulfur-doped transition metal hydroxides of the present disclosure, the following electrochemical analyses were performed using the aforementioned working electrodes of the Example and Comparative Examples.

Electrochemical Analyses

Electrochemical measurements were performed using an Autolab electrochemical workstation (Muti Autolab/M204) with a built-in electrochemical impedance spectroscopy (EIS) analyzer. At room temperature, 1 M KOH (Honeywell) and 0.33 M urea (UniRegion Bio-Tech) were used as electrolytes. Using the products of Example 1 and Comparative Examples 1 to 3, graphite rod and Ag/AgCl as a working electrode, a counter electrode, and a reference electrode, respectively, and using a standard three-electrode electrolytic cell system for measurements.

A linear sweep voltammetry (LSV) curve was obtained at a scan rate of 5 mV/s, and E (Ag/AgCl) was converted into a reversible hydrogen electrode (RHE) potential according to the following Formula 1. The pH measured by the electrolyte was 13.68, and all polarization curves were corrected by 90% IR compensation.

Using the polarization curve to draw the diagram of the Tafel slope. From the relationship diagram between E(RHE) and $\log_{10} |j|$ (Formula 2), the Tafel slope value could be obtained by the slope of the obtained linear region, in which a is a constant representing the potential value under the current density of j, b is the Tafel slope, and j is the exchange current density. The lower value of the Tafel slope means that the current density could be increased by 10 times with a smaller applied potential. Therefore, the value of the Tafel slope shows the charge transfer kinetics of the electrochemical reaction.

Electrochemical Impedance Spectroscopy (EIS): applying a weak AC voltage, and perturbing through the tiny vibration of the AC sine wave. In the same frequency range, measuring the impedance change with the change of frequency, and drawing the impedance map to obtain the impedance information of the entire circuit system. The solution resistance (Rs) is related to the resistance of the electrolyte between the working electrode and the reference electrode, while the charge transfer resistance (Rct) is the impedance of the interfacial charge transfer between the electrode and the electrolyte.

Electrochemical Surface Area Analysis (ECSA): cyclic voltammetry (CV) was performed at different scanning rates of 20, 40, 60, 80, 100, and 120 mV/sec in the range of −0.35 V to 0.35 V, respectively. Drawing the CV curve to obtain the capacitance value ($C_{dl}$) of the double layer, which is the slope of the curve of (JA-Jc)/2 relative to the scan rate when E=0, $C_{dl}$ has a linear relationship with ECSA which could be obtained from the following Formula 3, and $C_s$ is the specific capacitance value affected by the solution environment. The electrolyte used in the present disclosure has a $C_s$ of about 0.04 mF/cm².

$$E(RHE) = E(Ag/AgCl) + 0.059 \times pH + 0.197 \times V \quad \text{Formula 1}$$

$$E(RHE) = a + b \times \log_{10}|j| \quad \text{Formula 2}$$

$$ECSA = \frac{C_{dl}}{C_s} \quad \text{Formula 3}$$

Figure 11:
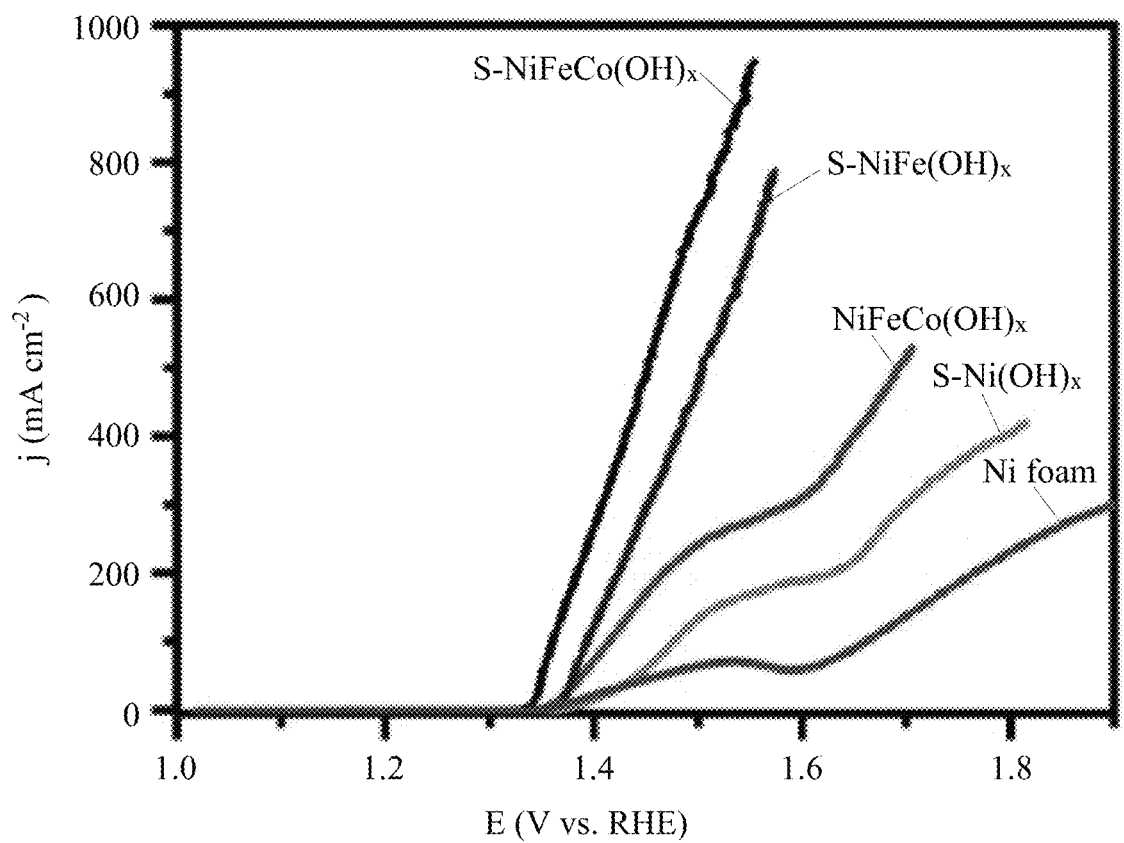
FIG. 11 is the polarization linear sweep voltammetry (LSV) curves of Example 1, Comparative Examples 1 to 3, and nickel foam of the present disclosure.
Figure 12:
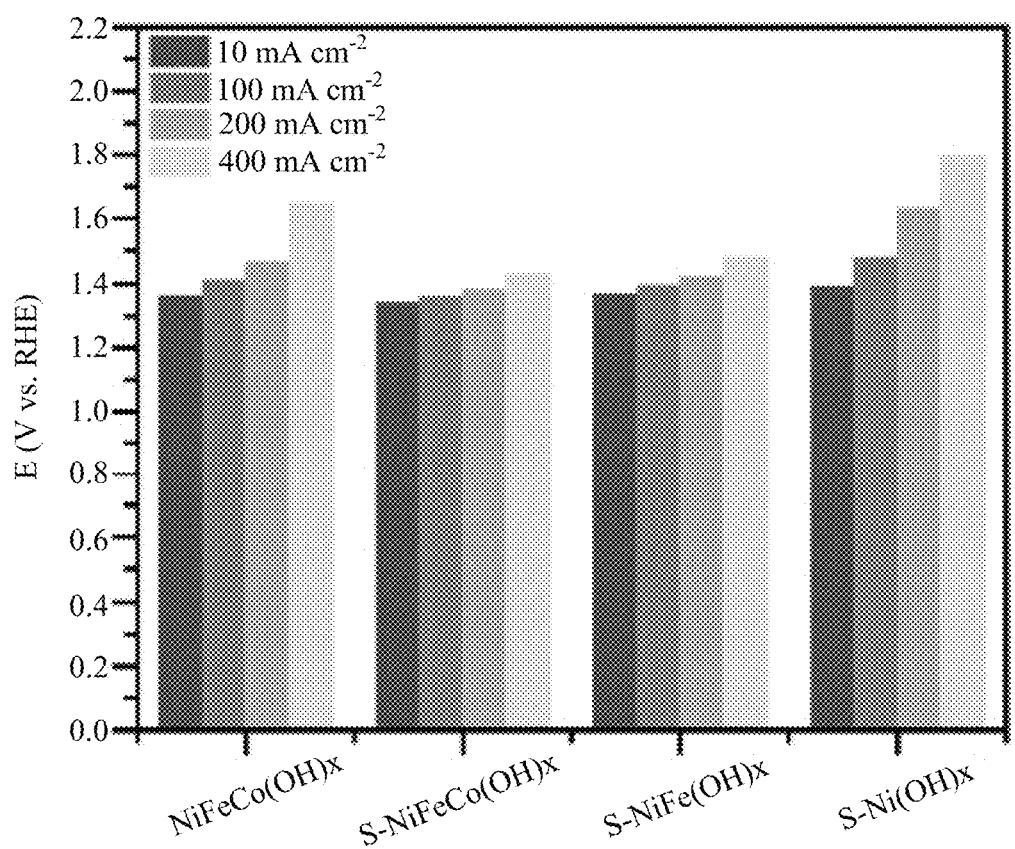
FIG. 12 is a bar graph of the reversible hydrogen electrode (RHE) potential of Example 1 and Comparative Examples 1 to 3 of the present disclosure at different current densities.

As shown in FIG. 11, besides Example 1 and Comparative Examples 1 to 3, the nickel foam was measured in the same way as a comparison. It could be seen that the four samples among Example 1 and Comparative Examples 1 to 3 all have a better UOR catalytic performance than nickel foam. Therefore, after the preparation method of the present disclosure undergoes a process in a short while, the materials with catalytic activity were indeed grown on the nickel foam, thereby improving the catalytic performance of the nickel foam. FIG. 12 demonstrates the reversible hydrogen electrode (RHE) potential histograms of the synthesized samples of Example 1 and Comparative Examples 1 to 3 at current densities of 10, 100, 200, and 400 mA cm⁻². The lower the applied potential required to achieve the same current density, the better the UOR catalytic reaction is. The Fe-free S—Ni(OH)$_x$ (Comparative Example 3) shows the highest potential, while the sulfur-doped S—NiFeCo(OH)$_x$ (Example 1) and S—NiFe(OH)$_x$ (Comparative Example 2) exhibit lower RHE potentials than NiFeCo(OH)$_x$ (Comparative Example 1) without sulfur. Compared to S—NiFe(OH)$_x$ with binary metal (Comparative Example 2), S—NiFeCo (OH)$_x$ with ternary metal (Example 1) exhibits a lower RHE potential. Further, S—NiFeCo(OH)$_x$ (Example 1), having the best performance of UOR catalysis, has RHE potential of 1.34, 1.36, 1.38 and 1.43 V at current densities of 10, 100, 200 and 400 mA cm⁻², respectively. The current density of 900 mA cm⁻² could be achieved by applying an RHE potential of 1.54 V, indicating that S—NiFeCo(OH)$_x$ has an excellent UOR catalytic performance.

Figure 13:
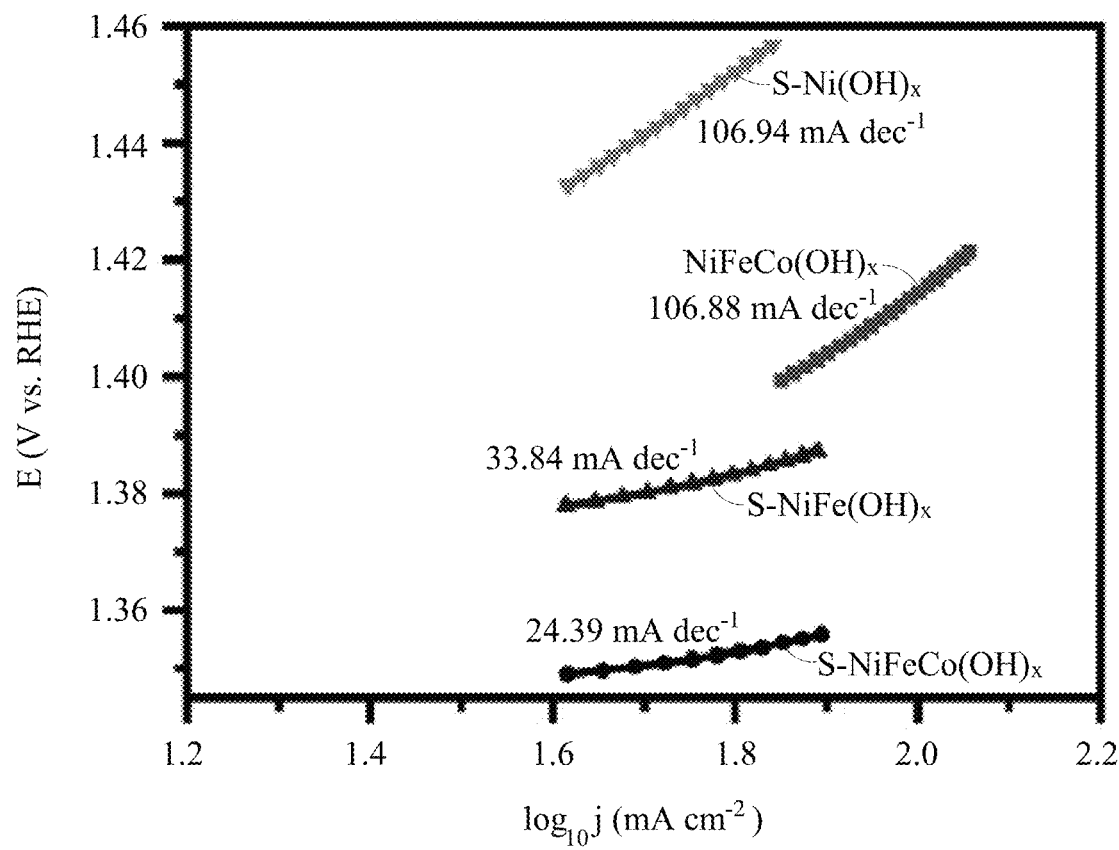
FIG. 13 shows the Tafel slopes of Example 1 and Comparative Examples 1 to 3 of the present disclosure.

The Tafel slope derived from the LSV curve was shown in FIG. 13, and the Tafel slope of NiFeCo(OH)$_x$ (Example 1), 24.39 mV dec⁻¹, was the smallest, which was lower than that of 33.84 mV dec⁻¹ for S—NiFe (OH)$_x$ (Comparative Example 2), 106.88 mV dec⁻¹ for NiFeCo(OH)$_x$ (Comparative Example 1), and 106.94 mV dec⁻¹ for S—Ni(OH)$_x$ (Comparative Example 3). The foregoing data indicate that S—NiFeCo(OH)$_x$ (Example 1) exhibits excellent reaction kinetics. Table 9 shows the RHE potential and the Tafel slope of the samples of Example 1 and Comparative Examples 1 to 3 at a current density of 100 mA cm⁻².

TABLE 9

RHE potential and Tafel slope of samples of
Example 1 and Comparative Examples 1 to 3

|  |  | E(RHE) at 100 mAcm$^{-1}$ | Tafel slope |
|---|---|---|---|
| Example 1 | S—NiFeCo(OH)$_x$ | 1.36 | 24.39 |
| Comparative Example 1 | NiFeCo(OH)$_x$ | 1.41 | 106.88 |
| Comparative Example 2 | S—NiFe(OH)$_x$ | 1.39 | 33.84 |
| Comparative Example 3 | S—Ni(OH)$_x$ | 1.48 | 106.94 |

Figure 14:
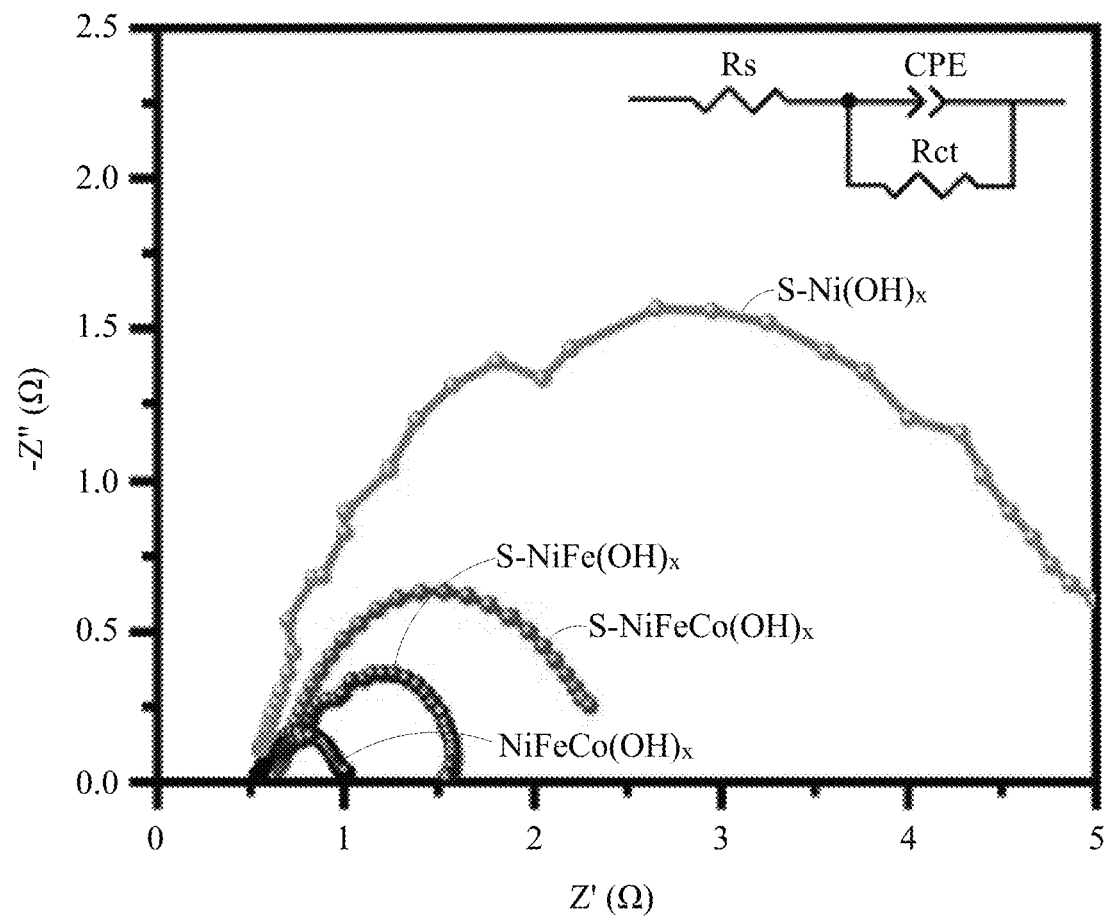
FIG. 14 shows Nyquist plots of electrochemical impedance spectroscopy (EIS) of Example 1 and Comparative Examples 1 to 3 of the present disclosure.

FIG. 14 shows a Nyquist plot of electrochemical impedance spectroscopy (EIS), and the semicircle diameter represents the charge transfer resistance ($R_{ct}$). S—NiFeCo(OH)$_x$ (Example 1) exhibits the smallest diameter semicircle with an $R_{ct}$ of 0.47Ω, which is much lower than that of 1.14Ω for S—NiFe (OH)$_x$ (Comparative Example 2), 1.46Ω for NiFeCo(OH)$_x$ (Comparative Example 1) and 4.7Ω for S—Ni(OH)$_x$ (Comparative Example 3), indicating that S—NiFeCo(OH)$_x$ (Example 1) has the fastest charge transfer and excellent UOR reaction kinetics due to the doping of sulfur in combination with the formation of Co—Fe alloy and the doping of multinary metals. The monometallic S—Ni(OH)$_x$ (Comparative Example 3) has no formation of metal phase, the synthesis reaction was relatively slow, the doped S was less, and therefore the results of S—Ni(OH)$_x$ were very different from those of other samples.

Figure 15:
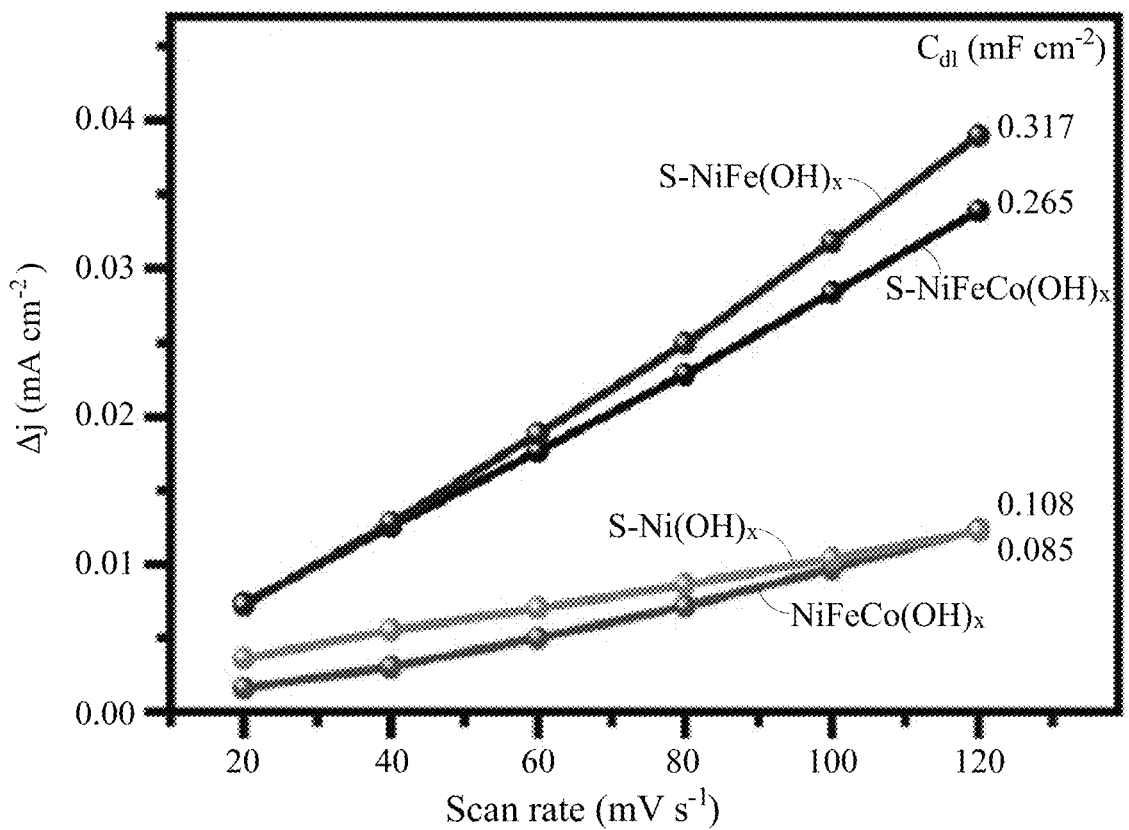
FIG. 15 shows the Cdl diagrams of Example 1 and Comparative Examples 1 to 3 of the present disclosure.

FIG. 15 shows the CV curves of Example 1 and Comparative Examples 1 to 3, and the $C_{dl}$ and ECSA were listed in Table 10. From the results shown in FIG. 15 and Table 10, it was found that S—NiFe(OH)$_x$ (Comparative Example 2) shows the highest ECSA value, slightly higher than S—NiFeCo(OH)$_x$ (Example 1), while the ECSA values of NiFeCo(OH)$_x$ (Comparative Example 1) and S—Ni(OH)$_x$ (Comparative Example 3) were much lower than those of S—NiFeCo(OH)$_x$ (Example 1) and S—NiFe(OH)$_x$ (Comparative Example 2). Since the ECSA of NiFeCo(OH)$_x$ (Comparative Example 1) was slightly higher than that of S—NiFe(OH)$_x$ (Comparative Example 2), the surface morphology of S—NiFe(OH)$_x$ (Comparative Example 2) exposes more active sites than S—NiFeCo(OH)$_x$ (Example 1), while the surface morphology of NiFeCo(OH)$_x$ (Comparative Example 1) and S—NiFe(OH)$_x$ (Comparative Example 2) exposes less active sites.

TABLE 10

$C_{dl}$ value and ECSA value of Example
1 and Comparative Examples 1 to 3

|  |  | $C_{dl}$ (mF cm$^{-2}$) | ECSA |
|---|---|---|---|
| Example 1 | S—NiFeCo(OH)$_x$ | 0.265 | 6.625 |
| Comparative Example 1 | NiFeCo(OH)$_x$ | 0.108 | 2.7 |
| Comparative Example 2 | S—NiFe(OH)$_x$ | 0.317 | 7.925 |
| Comparative Example 3 | S—Ni(OH)$_x$ | 0.085 | 2.125 |

Figure 16:
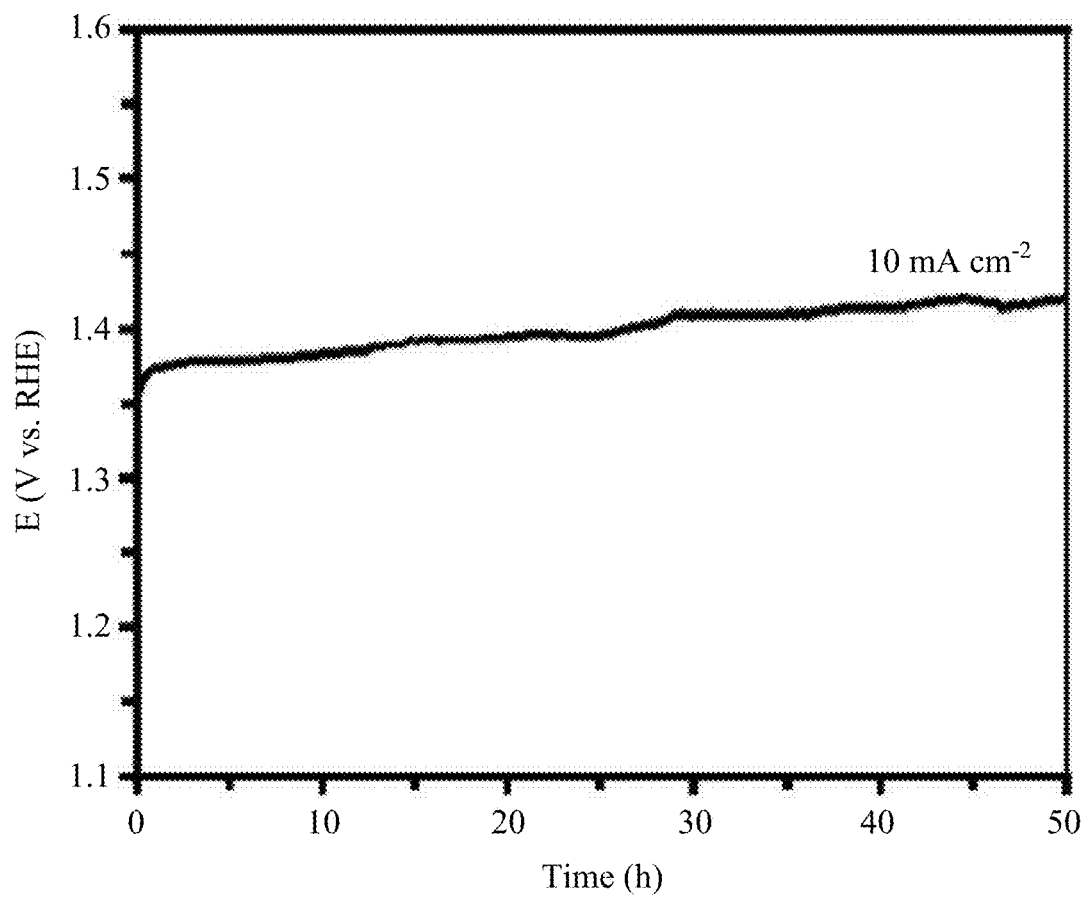
FIG. 16 is the durability test result of Example 1 of the present disclosure.

Electrochemical stability was one way to measure electrocatalytic performance. To measure the long-term durability (durability) of the electrode, the electrode of Example 1 was measured using chronopotentiometry for 60 hours, and chronopotentiometry was used for 50 hours at a current density of 10 mA/cm$^2$. The results were shown in FIG. 16.

UOR was a violent reaction compared with OER. After 50 hours, the potential of S—NiFeCo(OH)$_x$ slightly increases, showing good durability.

Scanning and Transmission Electron Microscopy Analysis after UOR Activation

Figure 17:
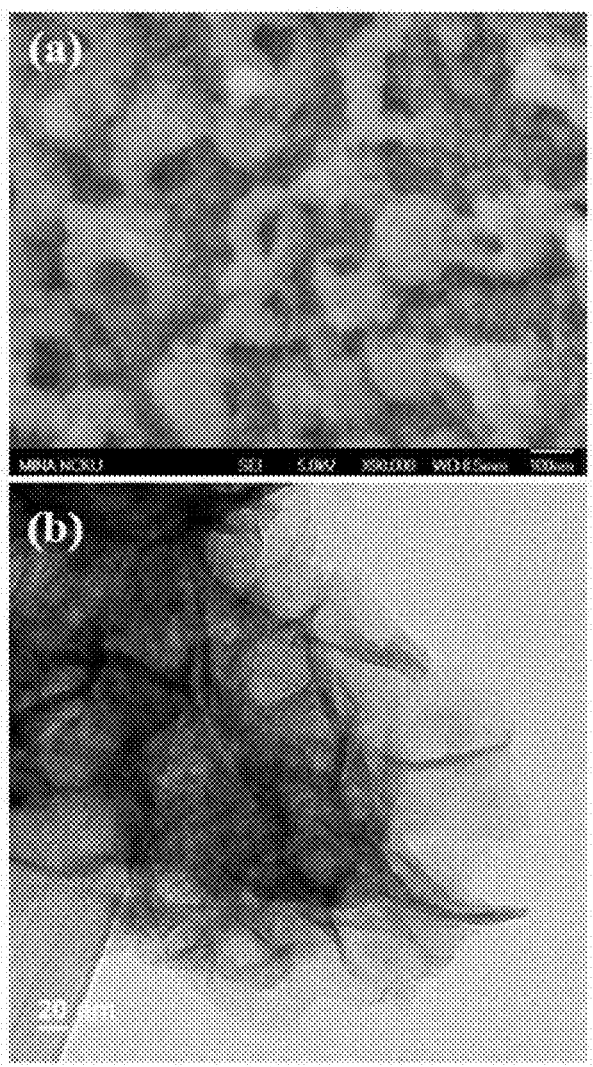
FIG. 17 shows (a) SEM image and (b) TEM image of Example 1 of the present disclosure after the durability test.

To further understand the changes in the catalyst during the UOR reaction, SEM and TEM were used to analyze the morphological and structural differences before and after UOR activation. FIG. 17 shows (a) SEM images and (b) TEM images of S—NiFeCo(OH)$_x$ (Example 1) at 10 mA cm$^2$ after a 30-hour durability test. It could be seen from the (a) SEM results of in FIG. 17 that the morphology of S—NiFeCo(OH)$_x$ (Example 1) before being activated was a microsphere filled with nanoparticles. Part of the nanoparticles disappeared after a 30-hour durability test, resulting in the destruction of the spherical shape, and from the TEM in FIG. 17(b), it could be seen that the S—NiFeCo(OH)$_x$ (Example 1) tested for 30 hours was the same microsphere as before activation, and the internal shape was like a flower-like shape. By contrast, the S—NiFeCo(OH)$_x$ (Example 1) becomes more porous after activation, and as shown by the SEM results, the complete spherical shape was destroyed.

Figure 18:
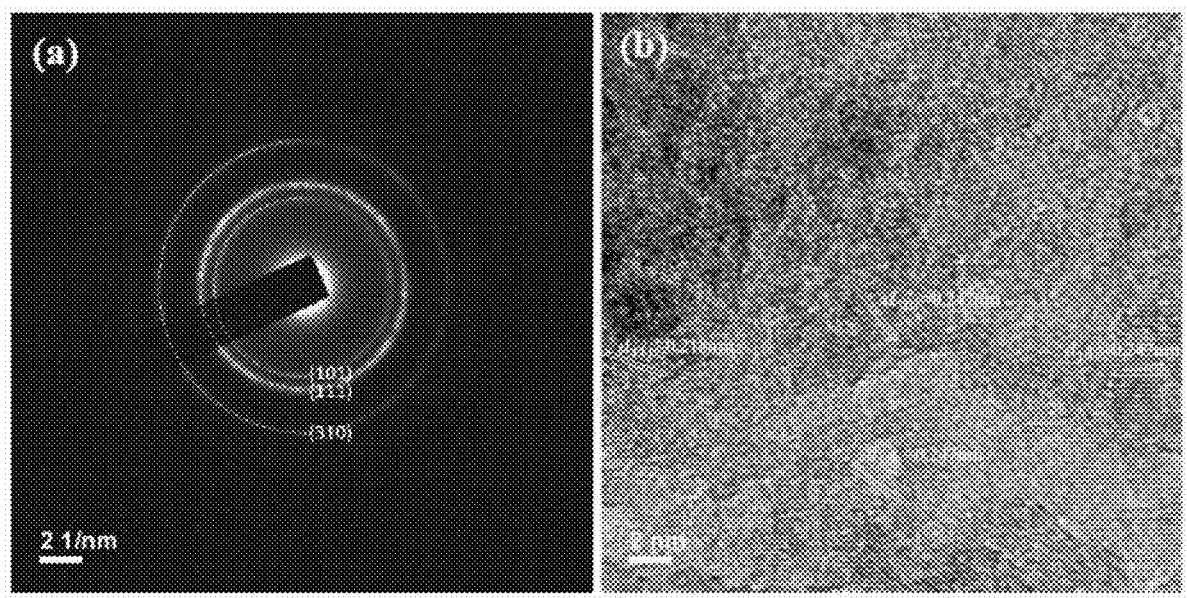
FIG. 18 shows (a) SAED and (b) HRTEM images of Example 1 of the present disclosure after the durability test.

FIG. 18 is (a) SAED and (b) HRTEM images of S—NiFeCo(OH)$_x$ (Example 1) after a 30-hour durability test. From the (a) SAED image, the crystallinity of S—NiFeCo(OH)$_x$ after 30 hours of testing becomes higher and, S—NiFeCo(OH)$_x$ was transformed into another new structure compared with the original S—NiFeCo(OH)$_x$. The SAED ring belongs to the (101), (111), and (310) planes of NiOOH (JCPDS #27-0956), and obvious lattice fringes could be seen from HRTEM, with interplanar spacings of 0.218 nm and 0.247 nm, corresponding to (111) and (101) planes of NiOOH. Given the foregoing, after a durability test of the original sulfur-doped hydroxide with low crystallinity, the lattice was transformed into a high-crystalline metal oxyhydroxide MOOH, which forms active sites and promotes catalytic performance.

Figure 19:
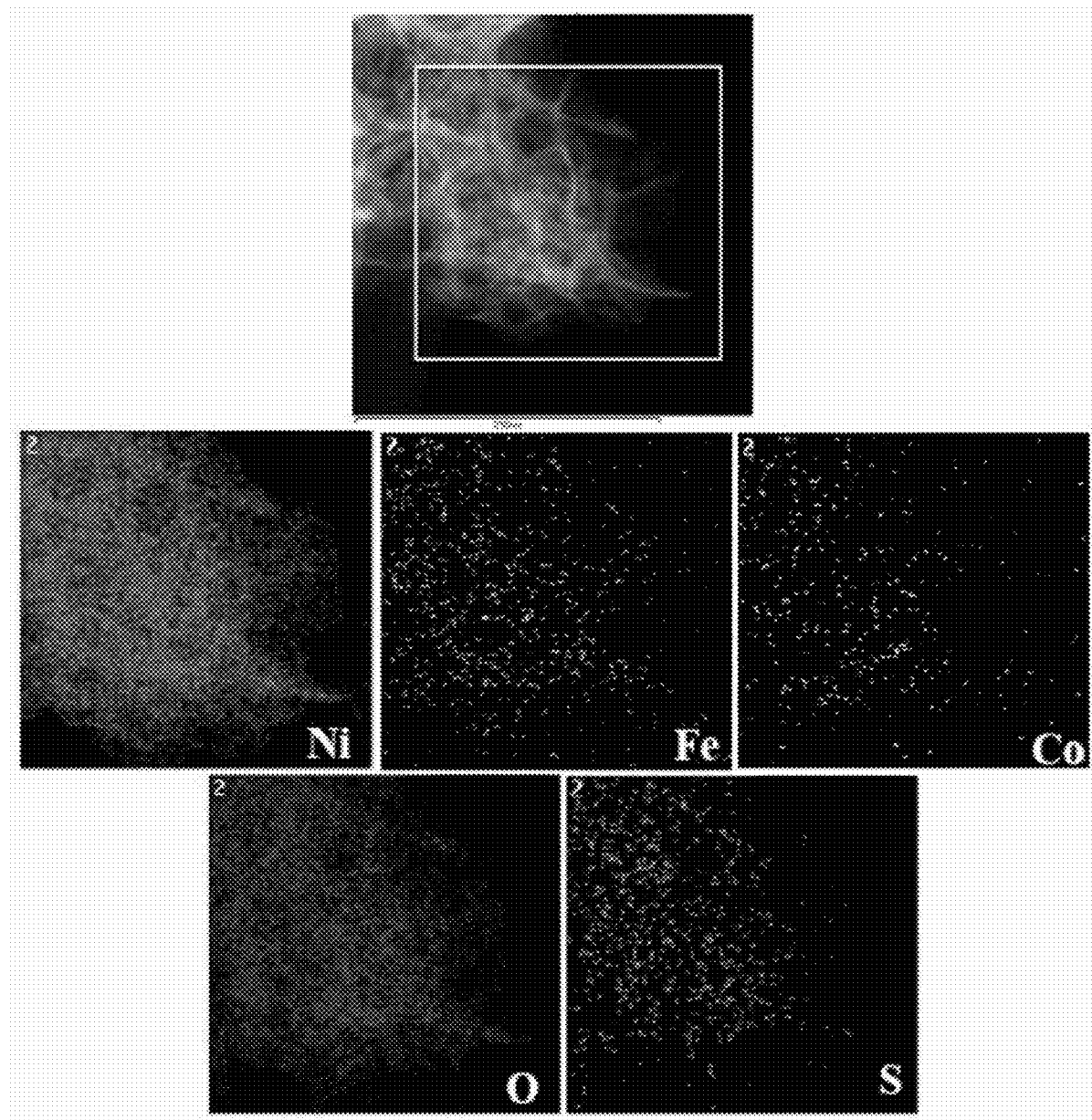
FIG. 19 shows the HAADF-STEM and mapping diagrams of Example 1 of the present disclosure subjected to the durability test.
Figure 20A:
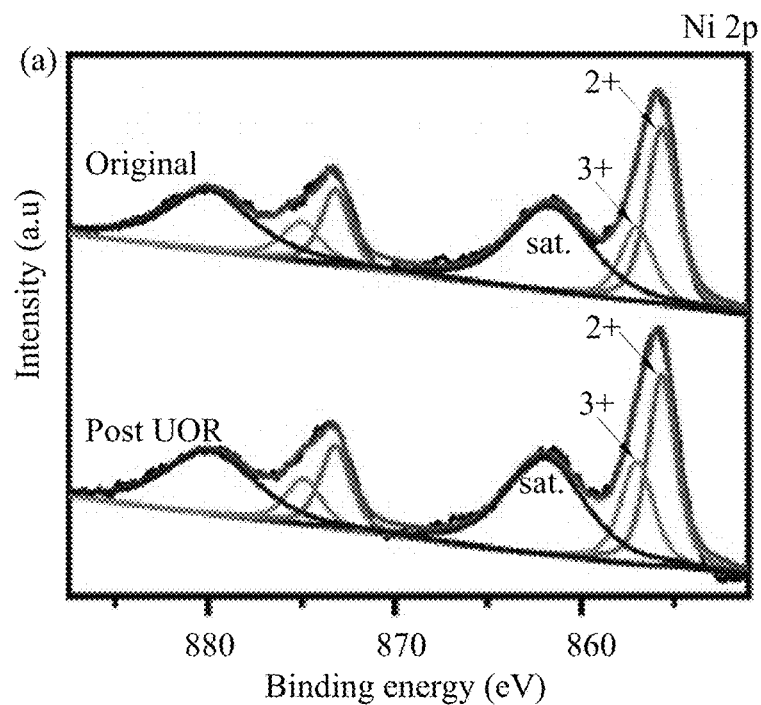
FIGS. 20A to 20E are the XPS spectra of each element after UOR activation in Example 1 of the present disclosure, respectively.
Figure 20B:
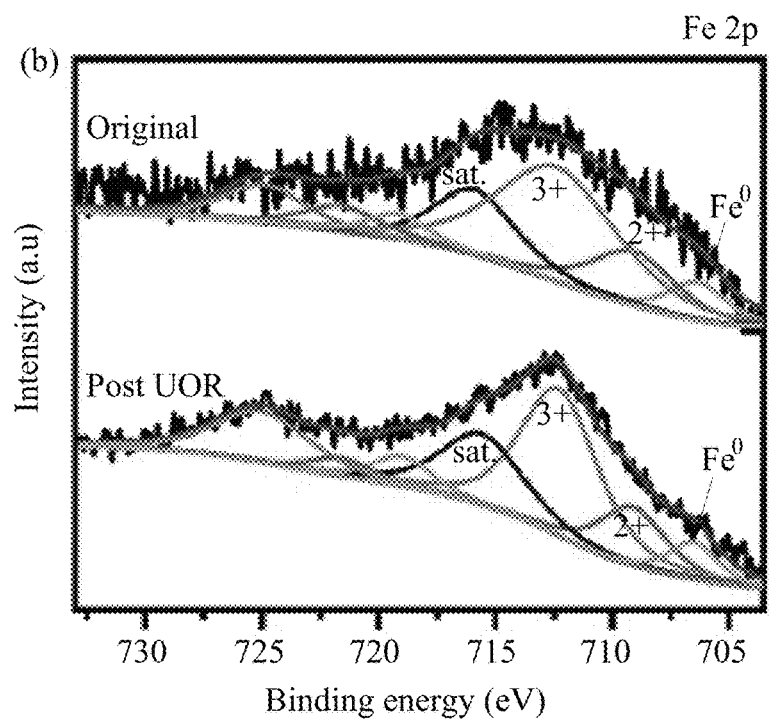
Figure 20C:
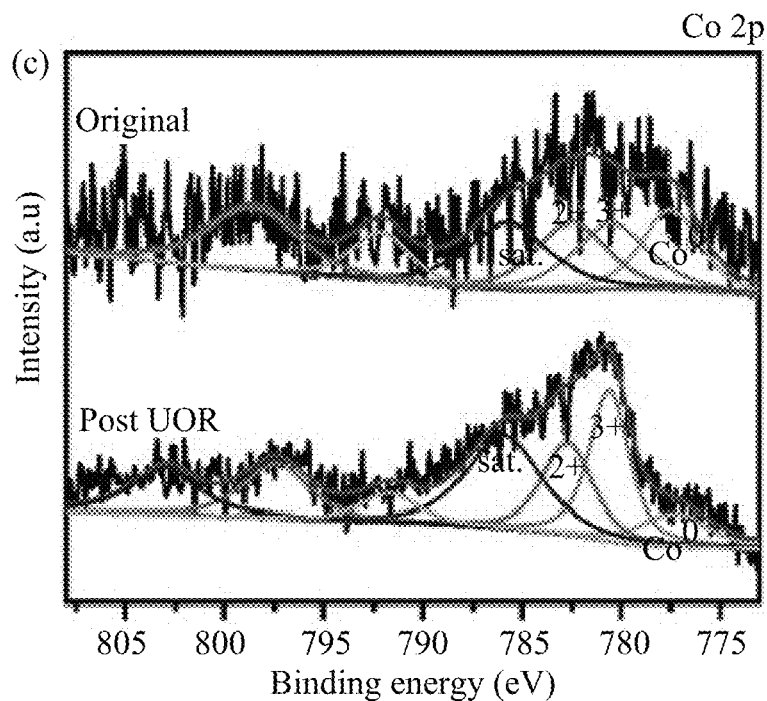
Figure 20D:
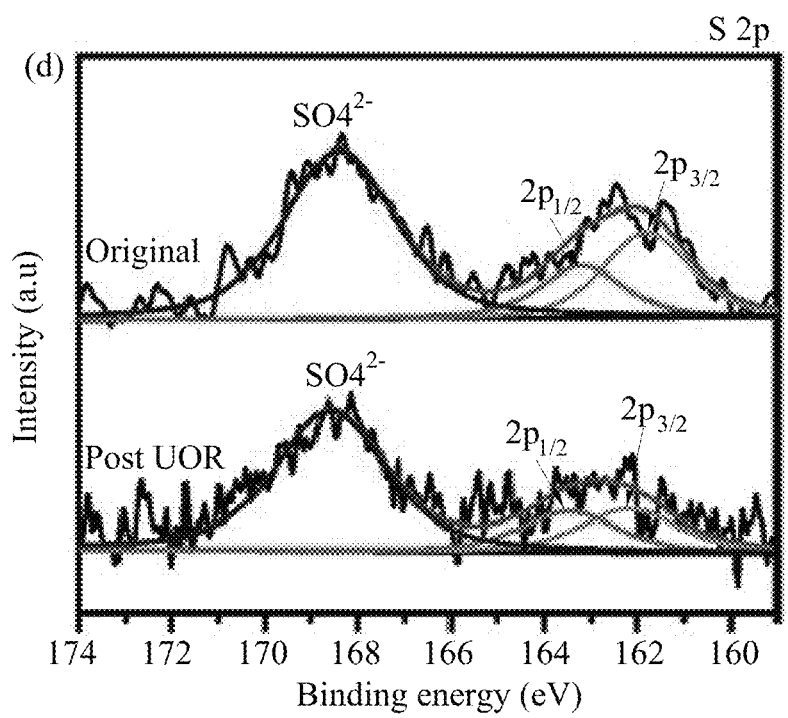
Figure 20E:
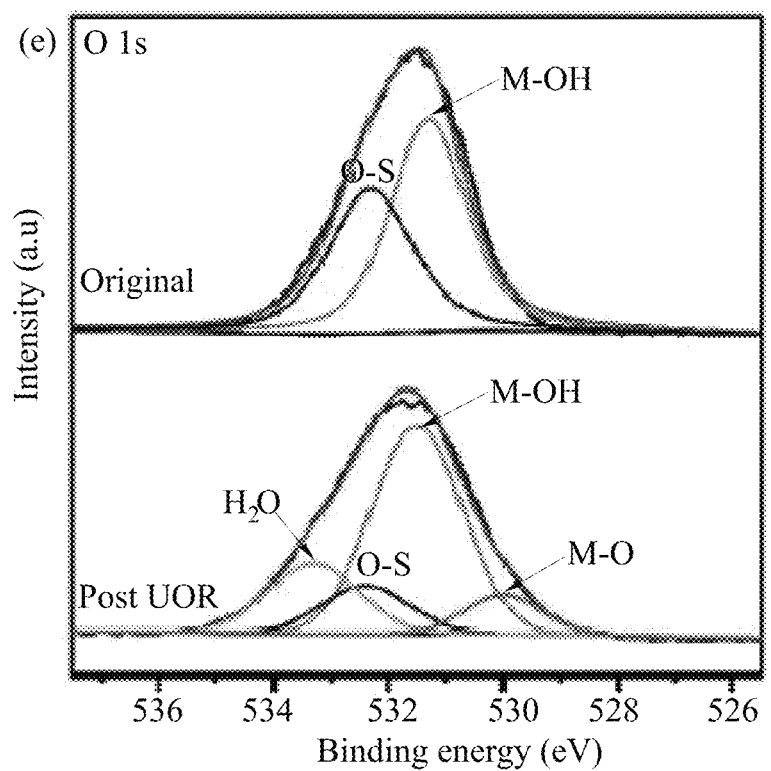
Figure 21A:
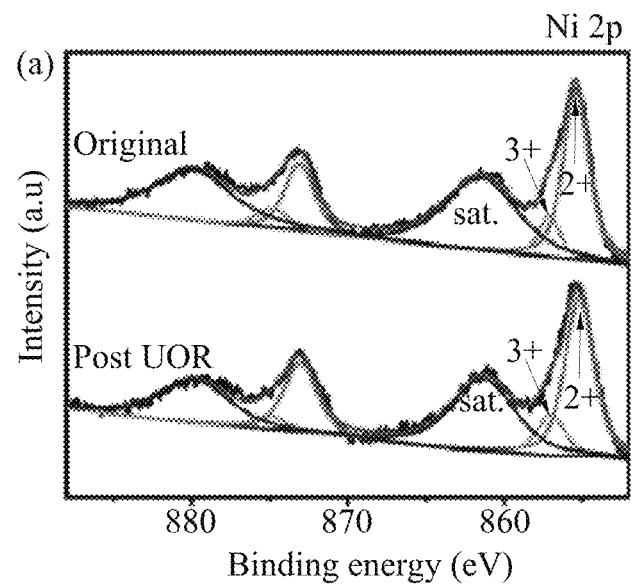
FIGS. 21A to 21D are the XPS spectra of each element after UOR activation in Comparative Example 1 of the present disclosure, respectively.
Figure 21B:
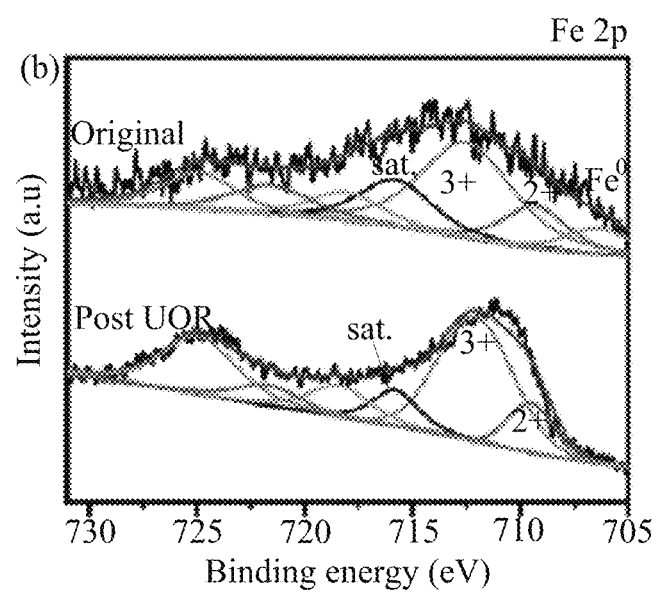
Figure 21C:
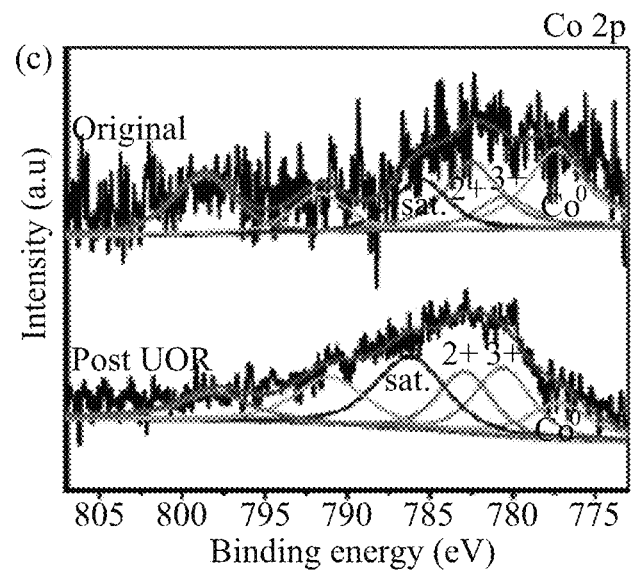
Figure 21D:
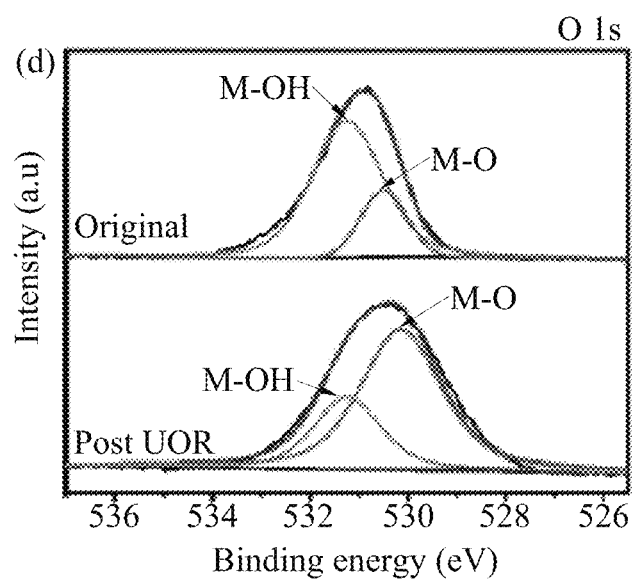
Figure 22A:
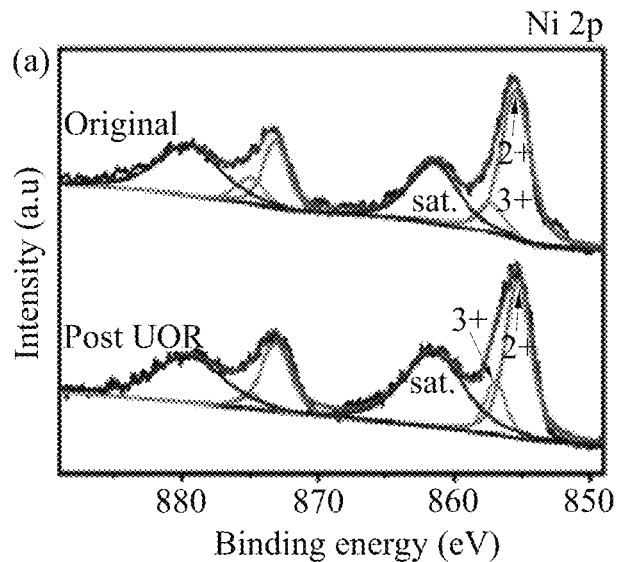
FIGS. 22A to 22D are the XPS spectra of each element after UOR activation in Comparative Example 2 of the present disclosure, respectively.
Figure 22B:
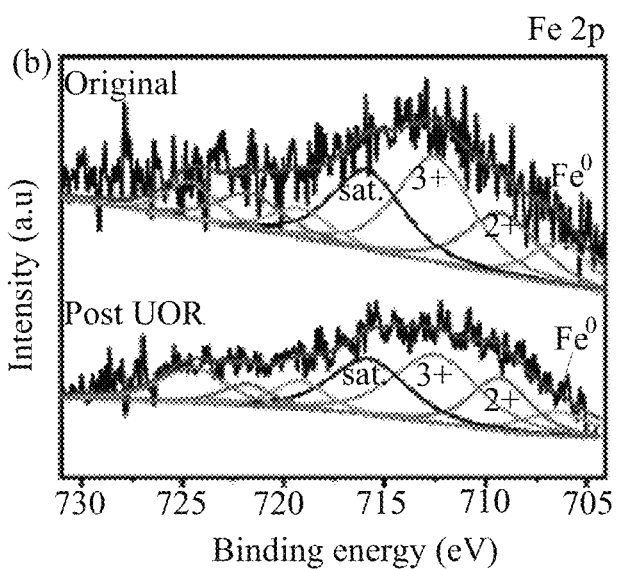
Figure 22C:
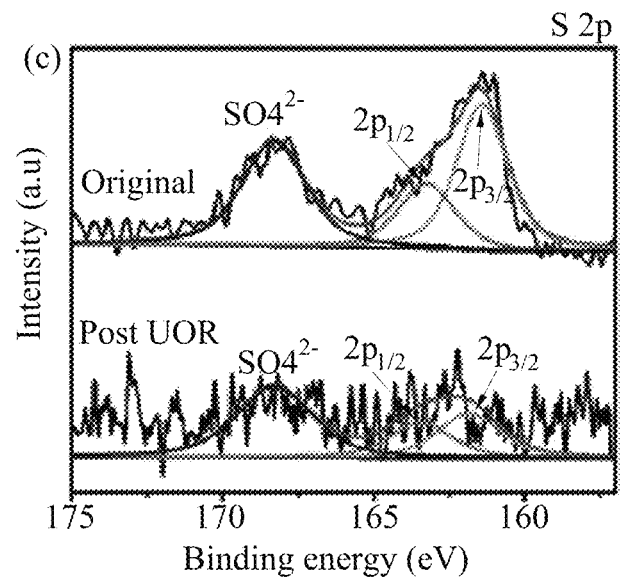
Figure 22D:
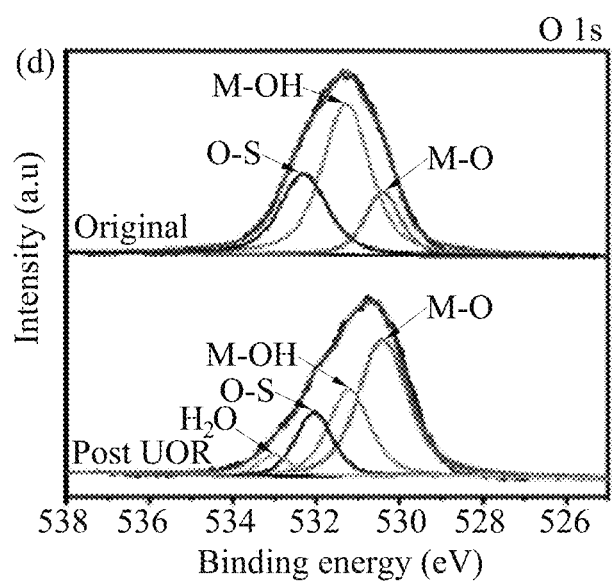
Figure 23A:
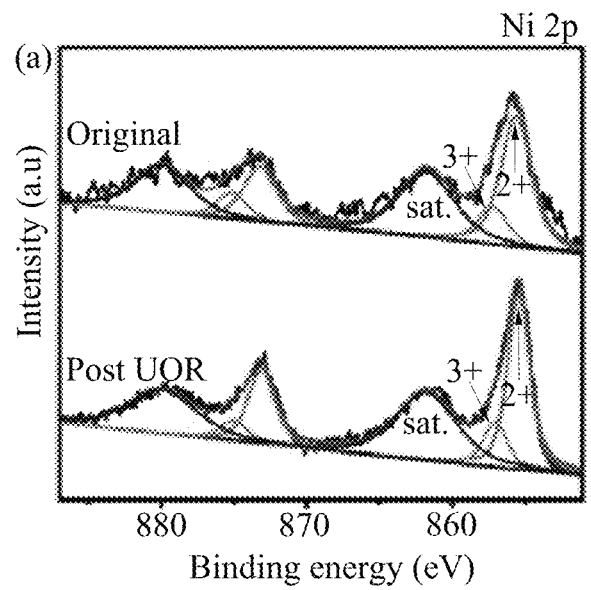
FIGS. 23A to 23C are the XPS spectra of each element after UOR activation in Comparative Example 3 of the present disclosure, respectively.
Figure 23B:
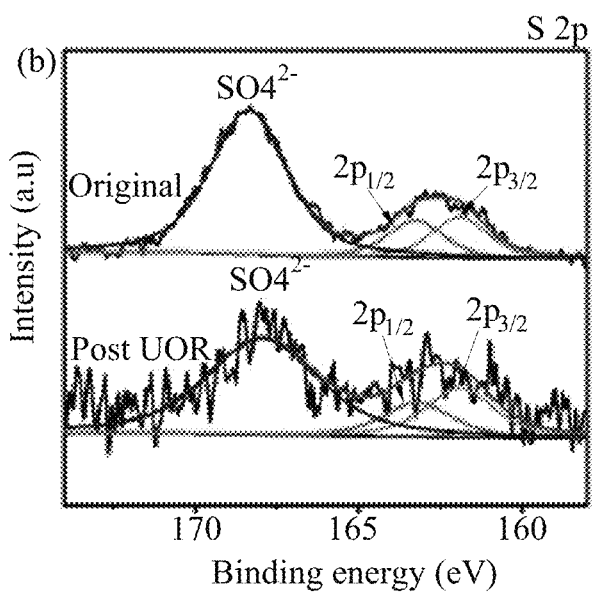
Figure 23C:
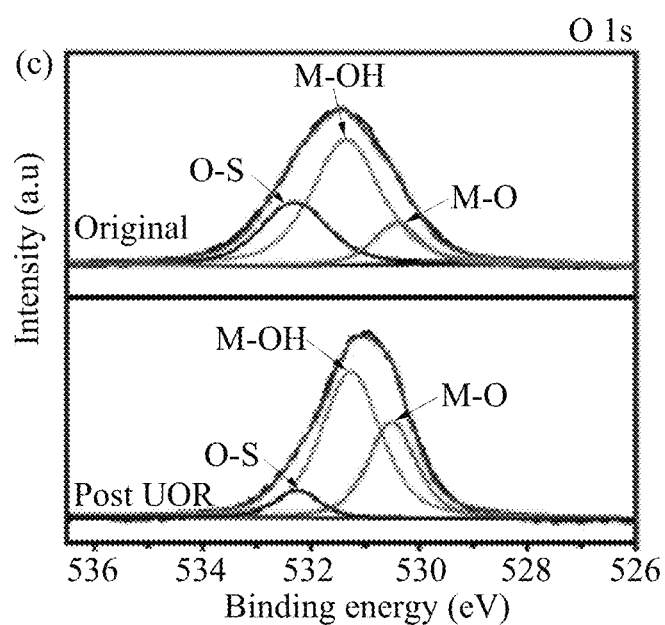

FIG. 19 is the HAADF-STEM and mapping diagram of S—NiFeCo(OH)$_x$ (Example 1) after a 30-hour durability test. The highly porous spherical morphology was confirmed from the HAADF-STEM image, and all elements (i.e., Ni, Fe, Co, O, and S) were uniformly distributed as observed from the map.

X-Ray Photoelectron Spectroscopy Analysis after Activation

The surface chemical bonding changes of the S—NiFeCo(OH)$_x$ (Example 1), NiFeCo(OH)$_x$ (Comparative Example 1), S—NiFe(OH)$_x$ (Comparative Example 2) and S—Ni(OH)$_x$ (Comparative Example 3) after UOR activation were analyzed by XPS. FIGS. 20 A to 20 E are the XPS spectra of each element of S—NiFeCo(OH)$_x$ (Example 1) after UOR activation. Positive shifts were found in the Ni 2p spectrum, indicating that the proportion of Ni$^{3+}$ increased; a very obvious positive displacement occurs in Fe 2p and Co 2p spectra after UOR, which was due to the rapid reduction of metallic phases Fe$^0$ and Co$^0$ due to surface oxidation, while the proportion of Fe$^{3+}$ and Co$^{3+}$ increases. Each metal has more high valence after UOR, indicating applying a voltage causes more M$^{3+}$ active sites to be generated, promotes the adsorption of OH$^-$ in the UOR reaction, and thus accelerates the catalytic reaction. In the O is spectrum, a new peak M-O appears at 533.2 eV, which belongs to the water absorbed by the surface after UOR. The M-OH ratio increases while the O—S decreases, representing the formation of MOOH; the S 2p spectrum shows that the concentrations of M-S and SO$_4^{2-}$ both decrease. All the above XPS spectra show that S—NiFeCo(OH)$_x$ was transformed into oxyhydroxide MOOH after UOR, which was consistent with the TEM results, confirming that after the UOR reaction, a large number of MOOH active sites were generated on the surface, and the UOR activity was activated.

FIGS. 21A to D, FIGS. 22A to D, and FIGS. 23A to C show the XPS spectrum of each element of NiFeCo(OH)$_x$ (Comparative Example 1), S—NiFe(OH)x (Comparative Example 2), and S—Ni(OH)$_x$ (Comparative Example 3) respectively after UOR activation, which has the same trend as that of S—NiFeCo(OH)$_x$ (Example 1). That is to say, the proportion of high-valence metals increases, the metal phase decreases due to oxidation, the M-O peak increases, and the concentration of O—S decreases. Therefore, all samples of Example 1 and Comparative Examples 1 to 3 exhibit the result of the conversion to active site of MOOH.

In-Situ Raman Analysis

Figure 24:
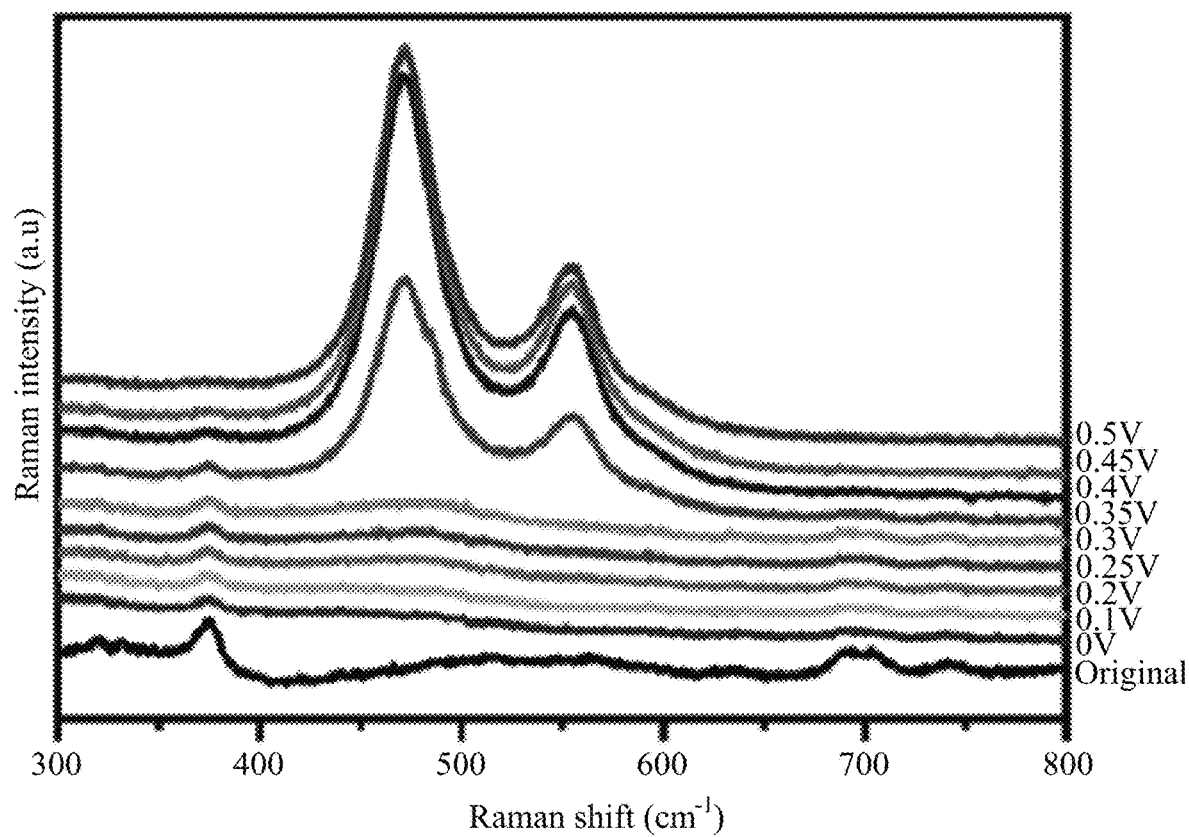
FIG. 24 is the in situ Raman spectrum diagram of Example 1 of the present disclosure.
Figure 25:
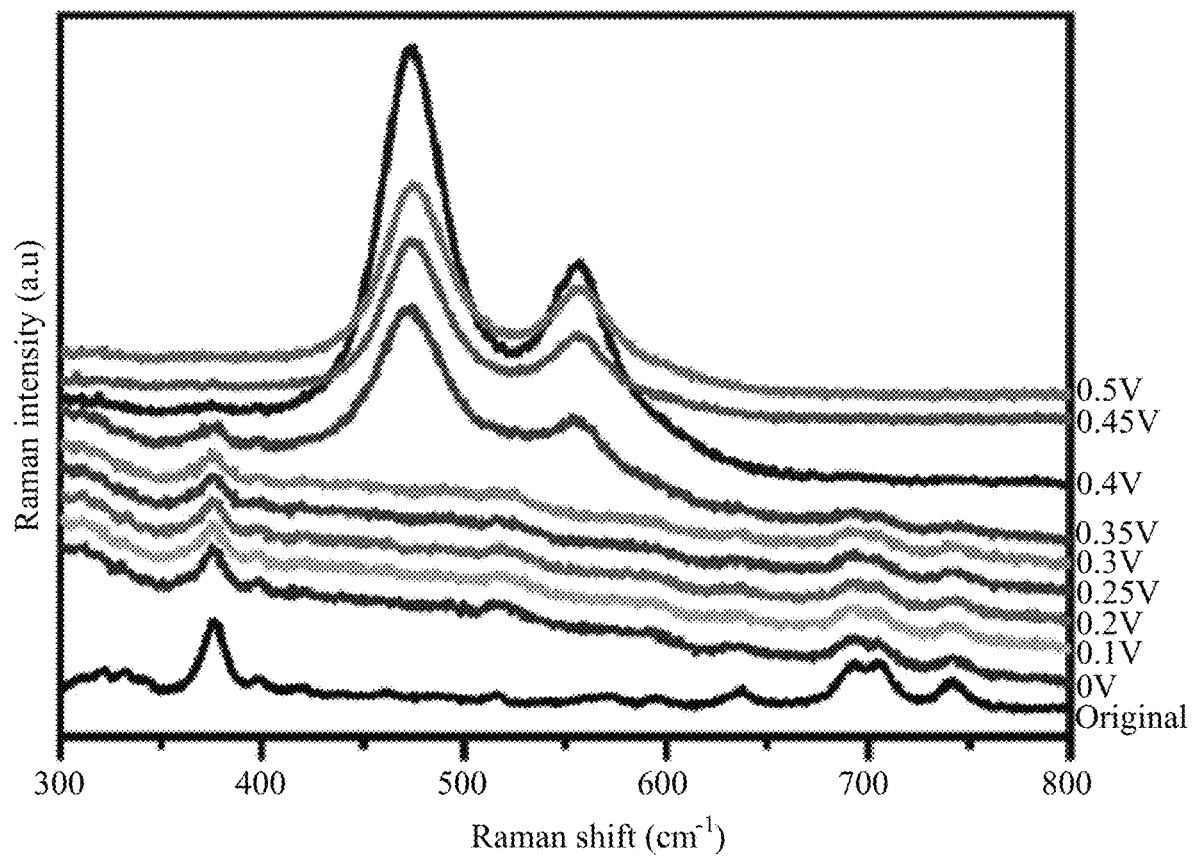
FIG. 25 is the in situ Raman spectrum diagram of Comparative Example 1 of the present disclosure.
Figure 26A:
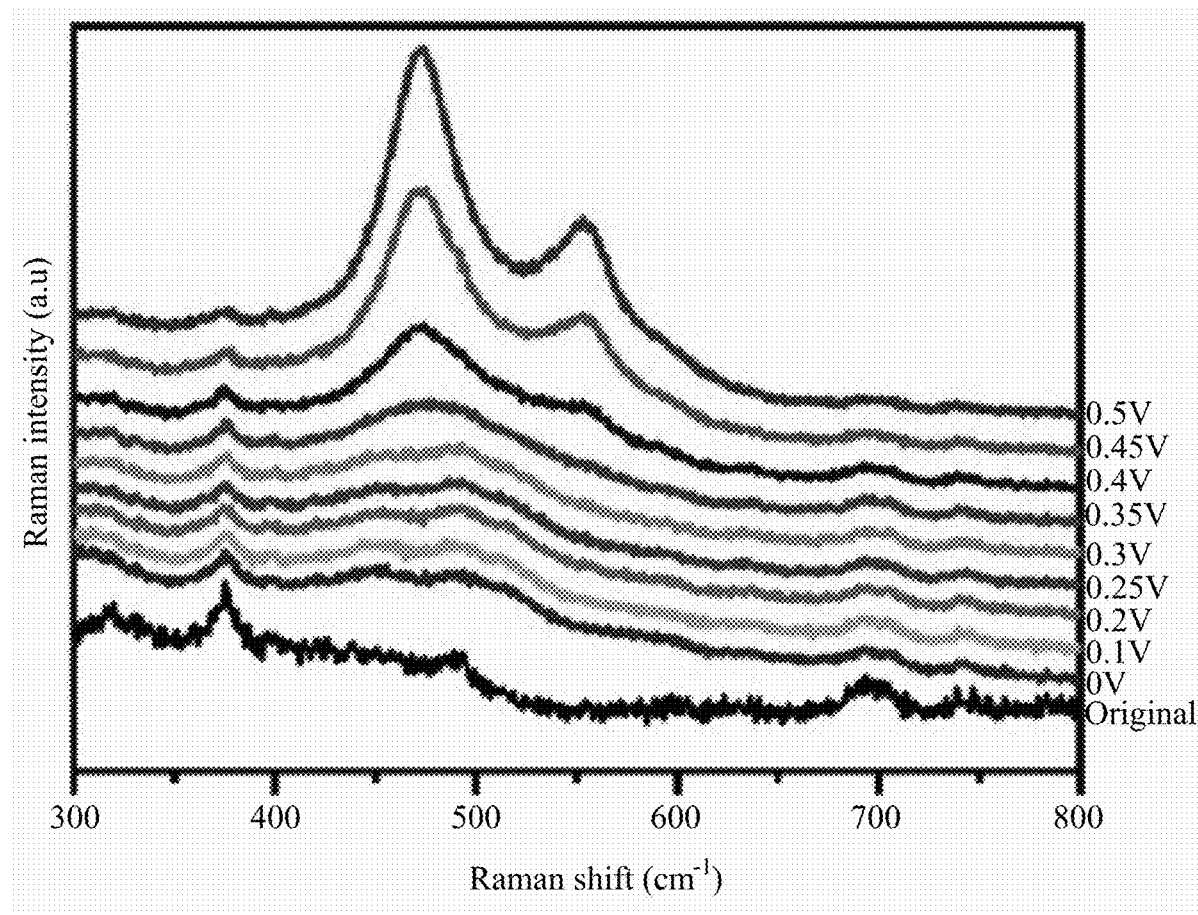
FIGS. 26A and 26B are the in situ Raman spectra of Comparative Examples 2 and 3 of the present disclosure, respectively.
Figure 26B:
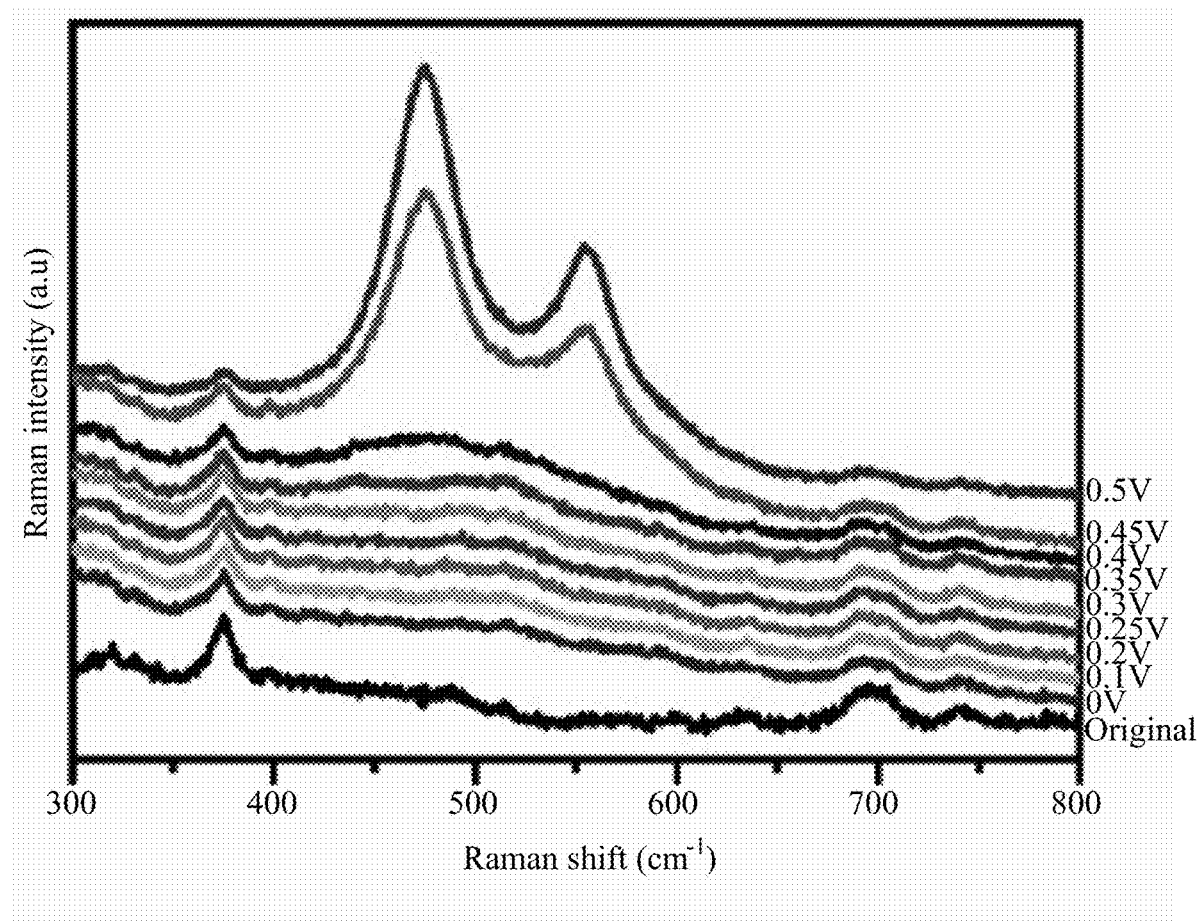

The Raman spectrometer of the Hierarchical Green-Energy Materials (Hi-GEM) Research Center of the National Cheng Kung University was used, which was the UniDRON Confocal Microscope Raman/PL Spectroscopy System, using a 532 nm laser and equipped with an Autolab electrochemical workstation (Muti Autolab/M204), to study the in situ change of crystal structure through in situ Raman spectroscopy. The urea oxidation catalyst obtained in Example 1 was used as the working electrode, Pt was used as the counter electrode, Ag/AgCl was used as the reference electrode, and the electrolyte was 1 M KOH and 0.33 M urea. Raman signals were recorded at different applied potentials ranging from 0 to 0.5 V. In situ Raman spectrum of S—NiFeCo(OH)$_x$ (Example 1) was shown in FIG. 24, the initial S—NiFeCo(OH)$_x$ has broad characteristic peaks corresponding to the vibration of M-OH at 320 cm$^{-1}$ and 375 cm$^{-1}$. The peaks at 516, 561, 485, and 682 cm$^{-1}$ correspond to the vibration of M-O in the metal hydroxides and represent the structure of hydroxides. The signal of Raman spectral at 0 V potential was lower than that of the original spectrum due to the addition of electrolyte making the signal relatively weaker. When the applied potential was less than or equal to 0.3 V, the Raman spectrum remains unchanged. When the applied potential reaches 0.35 V, two large characteristic peaks at 470 cm$^{-1}$ and 550 cm$^{-1}$ appear, which belong to the vibration of M-OOH. With the increase of the applied potential, the MOOH peak gradually becomes larger, and the characteristic peak belonging to the hydroxides also becomes smaller. MOOH dominates in the end, representing the transformation of sulfur-doped hydroxide into the oxyhydroxide MOOH and the formation of active sites, which was consistent with the TEM and XPS results. FIG. 25 shows that MOOH also appears at 0.35 V in situ Raman spectrum of NiFeCo(OH)$_x$ (Comparative Example 1). However, the maximum MOOH characteristic peak appears at 0.4 V potential. When the potential value continuously increases, the MOOH characteristic peak value becomes smaller, indicating that the active sites of NiFeCo (OH)$_x$ were unstable. S—NiFeCo(OH)$_x$ (Example 1) forms more active sites with higher potential, indicating that the active sites of S—NiFeCo(OH)$_x$ are more stable, and therefore S—NiFeCo(OH)$_x$ (Example 1) have a better catalytic performance. The in situ Raman spectra of S—NiFe(OH)$_x$ (Comparative Example 2) and S—Ni(OH)$_x$ (Comparative Example 3) were shown in FIGS. 26A 26B, respectively, and the MOOH peaks of the two clearly appear at 0.4 V and 0.45 V, representing the need of applying a larger potential to form the active site of MOOH. Therefore, the MOOH formation of the ternary metal sample was faster, which means that the UOR catalytic reaction was faster. From the results of In-situ Raman spectroscopy, the sulfur-doped catalyst has active sites with better stability, and the higher the applied potential, the more the active sites. The multi-element catalyst could make active sites rapidly form, representing the faster UOR catalytic reaction. In other words, S—NiFeCo(OH)$_x$ (Example 1) has stable and rapidly generated active sites, and thus has the best UOR performance.

The above embodiments are only used to illustrate the principles and effects of the present disclosure, but not to limit the present disclosure. Anyone with ordinary skill in the art could make modifications to the above embodiments without departing from the spirit and scope of the present disclosure. Therefore, the protection scope of the present disclosure should be listed in the claims of this application.

What is claimed is:

1. A method for preparing a urea oxidation catalyst, comprising contacting a metal substrate with a homogeneous solution for performing a metal corrosion reaction to obtain the urea oxidation catalyst, wherein the homogeneous solution comprises transition metal nitrate precursors and a sulfur precursor dissolved therein, wherein the urea oxidation catalyst comprises a sulfur-doped transition metal hydroxide formed on the metal substrate, and wherein the transition metal hydroxide is represented by MNZ(OH)$_x$, the M, N and Z are iron, cobalt, and nickel, respectively, and x is a positive integer of 1 to 3.

2. The method according to claim 1, wherein the sulfur-doped transition metal hydroxide is uniformly formed on the metal substrate, and the metal substrate is a porous metal substrate.

3. The method according to claim 2, wherein the sulfur-doped transition metal hydroxide formed on the metal substrate includes a structure of nanoparticles.

4. The method according to claim 1, wherein the porous metal substrate is a nickel foam.

5. The method according to claim 1, wherein the transition metal nitrate precursors and the sulfur precursor are dissolved in water, ethanol, isopropanol, or any combination thereof.

6. The method according to claim 1, wherein the transition metal nitrate precursors include a nickel nitrate precursor, a ferric nitrate precursor and a cobalt nitrate precursor, and wherein the contents of the nickel nitrate precursor, the ferric nitrate precursor and the cobalt nitrate precursor are equimolar.

7. The method according to claim 1, wherein the urea oxidation catalyst comprises 25 to 30 element % of the nickel, 0.8 to 1.5 element % of the iron, 0.2 to 0.7 element % of the cobalt, 5 to 10 element % of the sulfur, and 55 to 70 element % of the O based on the total amount of the sulfur, M, N, Z, and O.

8. The method according to claim 1, wherein the sulfur precursor includes one selected from the group consisting of thiourea, sodium thiosulphate, sodium sulfide, and a combination thereof.

9. The method according to claim 1, which is carried out at room temperature.

10. The method according to claim 1, which is performed without applying voltage or current.

11. A urea oxidation catalyst, comprising a sulfur-doped transition metal hydroxide and a metal substrate, wherein the transition metal hydroxide is represented by MNZ(OH)$_x$, the M, N and Z are iron, cobalt, and nickel, respectively, and x is a positive integer of 1 to 3, and wherein the sulfur-doped transition metal hydroxide is disposed on the metal substrate.

12. The urea oxidation catalyst according to claim 11, wherein the metal substrate is a porous metal substrate.

13. The urea oxidation catalyst according to claim 12, wherein the porous metal substrate is a nickel foam.

14. The urea oxidation catalyst according to claim 11, wherein the urea oxidation catalyst comprises 25 to 30 element % of the nickel, 0.8 to 1.5 element % of the iron, 0.2 to 0.7 element % of the cobalt, 5 to 10 element % of the sulfur and 55 to 70 element % of the O based on the total amount of the sulfur, M, N, Z, and O.

15. The urea oxidation catalyst according to claim 11, wherein the sulfur-doped transition metal hydroxide includes a structure of nanoparticles.

16. An use of the urea oxidation catalyst according to claim 11, comprising applying the oxidation catalyst in a hydrogen fuel cell.

* * * * *